US010156908B2

(12) United States Patent
Stafford et al.

(10) Patent No.: US 10,156,908 B2
(45) Date of Patent: Dec. 18, 2018

(54) PINCH AND HOLD GESTURE NAVIGATION ON A HEAD-MOUNTED DISPLAY

(71) Applicant: Sony Interactive Entertainment Inc., Tokyo (JP)

(72) Inventors: Jeffrey Roger Stafford, Redwood City, CA (US); Richard L. Marks, Pleasanton, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/071,127

(22) Filed: Mar. 15, 2016

(65) Prior Publication Data

US 2016/0306431 A1 Oct. 20, 2016

Related U.S. Application Data

(60) Provisional application No. 62/148,111, filed on Apr. 15, 2015.

(51) Int. Cl.
*G09G 5/00* (2006.01)
*G06F 3/01* (2006.01)
*G06F 3/0484* (2013.01)
*G06F 3/0485* (2013.01)
(Continued)

(52) U.S. Cl.
CPC ........... *G06F 3/017* (2013.01); *G02B 27/017* (2013.01); *G02B 27/0172* (2013.01);
(Continued)

(58) Field of Classification Search
CPC ........ G06F 3/014; G06F 3/017; G06F 3/0484; G06F 3/04845; G06F 2203/04806; G06F 3/0485; G02B 27/017
See application file for complete search history.

(56) References Cited

U.S. PATENT DOCUMENTS 6,771,294 B1 * 8/2004 Pulli ................. G06F 3/011
345/173
8,947,323 B1 * 2/2015 Raffle .................. G09G 3/001
345/156
(Continued)

FOREIGN PATENT DOCUMENTS

EP 2624238 A1 * 8/2013 ............. G06F 3/014

OTHER PUBLICATIONS

PCT/2016/026348 International Search Report and the Written Opinion dated Jun. 24, 2016, 12 pages.

*Primary Examiner* — Mark Edwards
(74) *Attorney, Agent, or Firm* — Martine Penilla Group, LLP

(57) ABSTRACT

A system for performing a pinch and hold gesture is described. The system includes a head-mounted display (HMD) and a glove, which is worn by a hand of the user. Each finger segment of the glove includes a sensor for detecting positions of the finger segment when moved by the hand. The system includes a computing device interfaced with the HMD and the glove. The computing device analyzes data from the sensors of the finger segments to determine that a pinch and hold gesture is performed by at least two of the finger segments. Moreover, the computing device generates image data that is communicated to the HMD, such that a scene rendered on the HMD is modified to render a visual cue indicative of a location in the scene at which the pinch and hold gesture is associated.

25 Claims, 22 Drawing Sheets

(51) Int. Cl.
*G02B 27/01* (2006.01)
*G06F 3/00* (2006.01)

(52) U.S. Cl.
CPC ......... *G02B 27/0179* (2013.01); *G06F 3/005* (2013.01); *G06F 3/014* (2013.01); *G06F 3/0485* (2013.01); *G06F 3/04845* (2013.01); *G02B 2027/014* (2013.01); *G02B 2027/0138* (2013.01); *G02B 2027/0147* (2013.01); *G02B 2027/0178* (2013.01); *G02B 2027/0185* (2013.01); *G02B 2027/0187* (2013.01); *G06F 2203/04806* (2013.01)

(56) References Cited

U.S. PATENT DOCUMENTS

| | | | |
|---|---|---|---|
| 9,141,194 B1* | 9/2015 | Keyes | G06F 3/017 |
| 2009/0066725 A1* | 3/2009 | Nogami | A63F 13/10 345/632 |
| 2011/0107270 A1* | 5/2011 | Wang | G06F 19/3437 715/850 |
| 2012/0069055 A1* | 3/2012 | Otsuki | G06F 3/017 345/681 |
| 2012/0157203 A1* | 6/2012 | Latta | G06F 3/005 463/32 |
| 2013/0066526 A1* | 3/2013 | Mondragon | G09G 5/00 701/48 |
| 2014/0282275 A1* | 9/2014 | Everitt | G06F 3/017 715/863 |
| 2015/0077326 A1* | 3/2015 | Kramer | G06F 3/0325 345/156 |
| 2015/0177957 A1* | 6/2015 | Bae | G06F 3/04842 715/835 |
| 2016/0048211 A1* | 2/2016 | Raffle | G06F 3/017 715/863 |

* cited by examiner

| | LEFT HAND | RIGHT HAND | GESTURE | NAVIGATION |
|---|---|---|---|---|
| A. | PINCH AND HOLD | PINCH AND HOLD | PULL-IN | ZOOM-IN |
| B. | PINCH AND HOLD | PINCH AND HOLD | PUSH-OUT | ZOOM-OUT |
| C. | PINCH AND HOLD | PINCH AND HOLD | PULL APART | ZOOM-IN |
| D. | PINCH AND HOLD | PINCH AND HOLD | PUSH TOGETHER | ZOOM-OUT |
| E. | PINCH AND HOLD | PINCH AND HOLD | ROTATE BOTH HANDS | RELATIVE ROTATE IN YZ |
| F. | PINCH AND HOLD | PINCH AND HOLD | ROTATE ONE HAND | HINGE ROTATE IN YZ |
| G. | PINCH AND HOLD | PINCH AND HOLD | TILT | Z-ROTATION - CAN SEE UNDER VIRTUAL OBJECT |
| H. | PINCH AND HOLD | PINCH AND HOLD | TILT 2D VIRTUAL OBJECT | Z-ROTATION AND 2D VIRTUAL OBJECT BECOMES 3D |
| I. | DO NOTHING | PINCH AND HOLD | ROTATE RIGHT HAND | HINGE ROTATE IN YZ |
| J. | DO NOTHING | PINCH AND HOLD | SLIDE RIGHT HAND | SLIDE VIRTUAL ENVIRONMENT TO VIEW HIDDEN PORTION OF THE VIRTUAL ENVIRONMENT |
| K. | DO NOTHING | PINCH AND HOLD | RELEASE AND DOUBLE TAP | ZOOM-IN INTO CUED PORTION AND ZOOM-INTO PORTION OF VIRTUAL ENVIRONMENT |
| L. | DO NOTHING | PINCH AND HOLD | SLIDE AND RELEASE AND DOUBLE TAP | SLIDES CUED PORTION AND ZOOM-INTO PORTION OF VIRTUAL ENVIRONMENT ON WHICH THE CUED PORTION NOW OVERLAYS |

FIG. 2A

PINCH AND HOLD GESTURE NAVIGATION ON A HEAD-MOUNTED DISPLAY

CLAIM OF PRIORITY

This application claims the benefit of and priority, under 35 U.S.C. § 119(e), to U.S. Provisional Patent Application No. 62/148,111, filed on Apr. 15, 2015, and titled "Pinch and Hold Gesture Navigation on a Head-mounted Display", which is hereby incorporated by reference in its entirety.

FIELD

The present invention relates to methods and systems for navigating a scene displayed on a head-mounted display by applying a pinch and hold gesture.

BACKGROUND

Current gaming systems offer a wide variety of excitement and interaction to a game player. A gaming system includes a console device, a hand-held controller, and a display screen. The game player connects the hand-held controller to the console device and the console device to the display screen. The game player then downloads a game to the console device from a computer network or submits a disc into a disc slot of the console device to enable game play.

During game play, the game player operates the hand-held controller to play the game. For example, the game player selects a button or a combination of buttons to control an avatar within the game or to choose an environment for game play. However, to be able to play the game, the game player learns how each button controls movement of the avatar. Moreover, it is inconvenient for the game player to use the hand-held controller during play of the game.

It is in this context that embodiments of the invention arise.

SUMMARY

Embodiments described in the present disclosure provide methods and systems for navigating a scene displayed on a head-mounted display by applying a pinch and hold gesture.

In one embodiment, a system for performing a pinch and hold gesture is described. The system includes a head-mounted display (HMD) worn by a user. The system further includes a glove worn over a hand of the user. The glove has finger segments for each finger of the hand. Each finger segment includes a sensor for detecting positions of the finger segment when moved by the hand. The system includes one or more cameras for capturing images of the HMD and images of the glove and a computing device connected to the one or more cameras and interfaced with the HMD and the glove. The computing device analyzes data from the sensors of the finger segments to determine that a pinch and hold gesture is performed by at least two of the finger segments. Moreover, the computing device generates image data that is communicated to the HMD, such that a scene rendered on the HMD is modified to render a visual cue indicative of a location in the scene at which the pinch and hold gesture is associated. While the pinch and hold gesture is active, the computing device couples movement of the glove with movement of the scene, such that the scene moves with detected movement of the glove.

In an embodiment, a method for translating a viewable portion of a scene viewed via an HMD is described. The method includes capturing images of the HMD worn by a user in a real space to determine a view direction and changes in the view direction. The method further includes capturing images of a hand of the user, tracking the hand of the user from the captured images of the hand, and activating a pinning of the scene as viewed via the HMD such that the pinning fixes the scene to a location of the hand being tracked. The pinning is activated upon detecting a pinch and hold gesture performed by the hand. The method includes enabling translation of the scene in response to movement of the hand while the pinning is active. The translation enables a view beyond a current view of the scene. The method includes disabling the translation when the pinning is detected to be inactive. The pinning is inactive when the pinch and hold gesture is no longer detected.

In one embodiment, a method for changing a size of a scene viewed via an HMD is described. The method includes capturing images of the HMD worn by a user in a real space to determine a view direction and changes in the view direction. The method further includes capturing images of hands of the user, determining from the captured images that each hand performs a pinch and hold gesture, and fixing the scene to locations in the scene at which the captured images indicate the pinch and hold gestures are being performed. The method includes enabling change in a size of the scene in response to relative changes in separation between the hands while the scene is fixed and disabling change in size of the scene when one of the pinch and hold gestures from one of the hands is detected from the captured images to have been released.

Some advantages of the herein described embodiments include using a pinch and hold gesture and/or additional gestures to facilitate control of a scene. The pinch and hold gesture and/or additional gestures are performed using a hand or a glove. As such, there is no need to use a hand-held controller to perform the pinch and hold gesture and/or additional gestures. Moreover, use of the hands or the glove to perform the pinch and hold gesture and/or additional gestures makes a user feel as if he/she is performing a natural hand movement to interact with the scene. The natural hand movement provides the user with an immersive feeling, e.g., as is he/she is in the scene and performing actions in the scene.

Other aspects described in the present disclosure will become apparent from the following detailed description, taken in conjunction with the accompanying drawings, illustrating by way of example the principles described in the present disclosure.

BRIEF DESCRIPTION OF THE DRAWINGS

Various embodiments of the present disclosure are best understood by reference to the following description taken in conjunction with the accompanying drawings in which:

FIG. 2A is a table listing to illustrate various gestures performed by a user and an effect of the gestures on a scene that is displayed on a head-mounted display (HMD) worn by the user, in accordance with one embodiment of the present disclosure.

DETAILED DESCRIPTION

Systems and methods for navigating a scene displayed on a head-mounted display (HMD) by applying a pinch and hold gesture are described. It should be noted that various embodiments described in the present disclosure may be practiced without some or all of these specific details. In other instances, well known process operations have not been described in detail in order not to unnecessarily obscure various embodiments described in the present disclosure.

Figure 1:
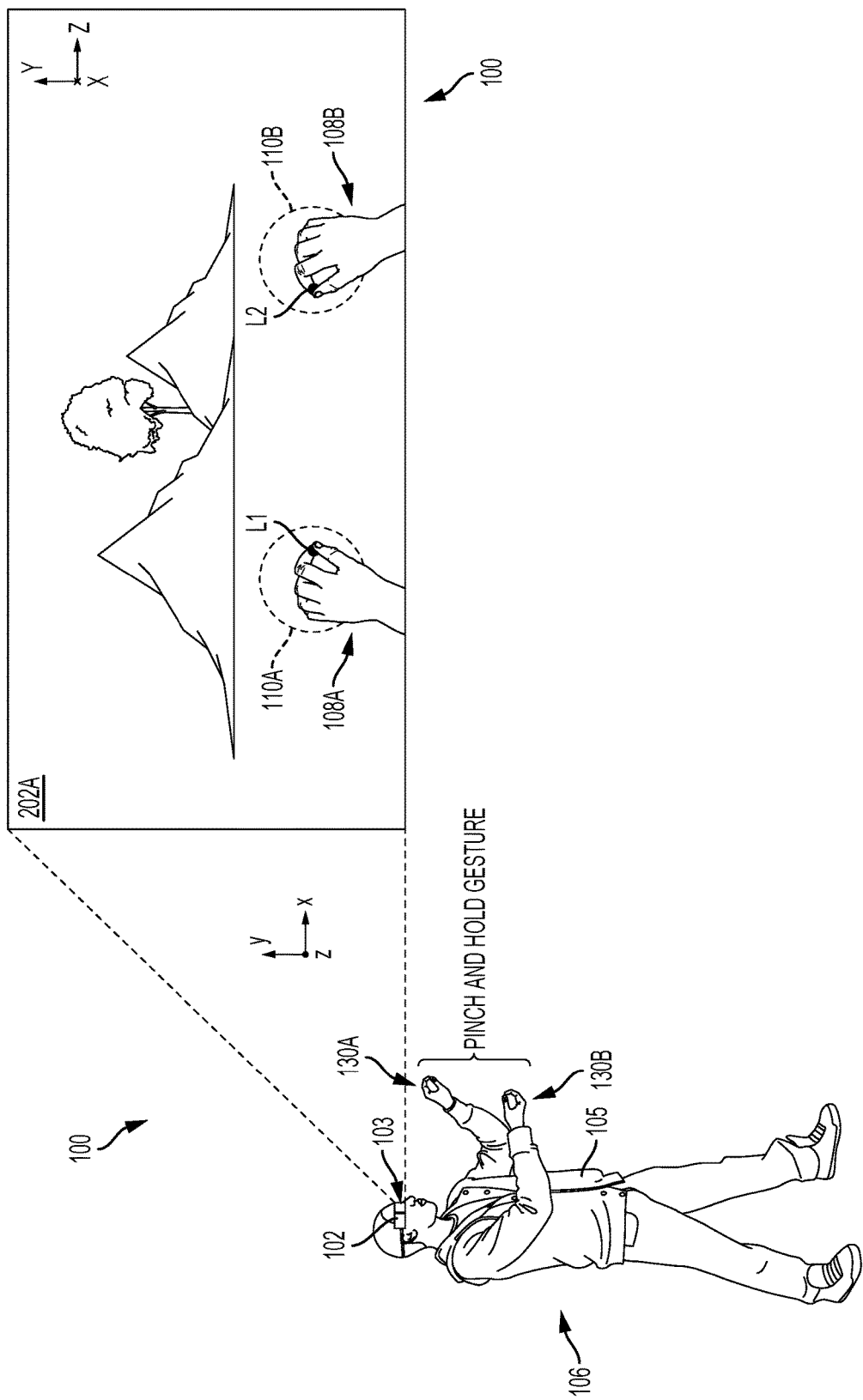
FIG. 1 is a diagram of a system to illustrate use of a pinch and hold gesture, in accordance with one embodiment of the present disclosure.

FIG. 1 is a diagram of an embodiment of a system 100 to illustrate use of a pinch and hold gesture. A user 106 is wearing an HMD 102 on his/her head. For example, the user 106 wears the HMD 102 to cover both of his/her eyes. The user 106 performs a pinch gesture, e.g., brings his/her thumb in contact with one or more of his/her other fingers, etc., using his/her hand 130A and performs a pinch gesture using his/her other hand 130B. Examples of the one or more other fingers of a hand include an index finger, a middle finger, a ring finger, and a little finger.

A camera system, e.g., one or more digital cameras, one or more infrared cameras, one or more depth cameras, etc., captures image data of the HMD 102 and of the hands 130A and 130B of the user 106. For example, a camera located in a real space, e.g., a room, a real-world environment, a location, a warehouse, etc., in which the user 106 and the HMD 102 are located, captures a direction of view of the HMD 102 and any changes in the direction of view. As another example, a camera located in the real space or on the HMD 102 captures image data of fingers of hands 130A and 130B of the user 106. The image data is sent from the camera system, via a wired or a wireless protocol, to a processor of a computing device, e.g., a game console, a desktop computer, a laptop computer, a tablet, a smart phone, etc. Examples of a processor, as used herein, include a microprocessor, an application specific integrated circuit (ASIC), a programmable logic device (PLD), a microcontroller, a central processing unit (CPU), etc.

The processor of the computing device analyzes the image data to track the hands 130A and 130B, e.g., to determine positions and orientations of fingers of the hands 130A and 130B of the user 106, etc., and to determine positions and orientations of the HMD 102. For example, the processor of the computing device determines, from the image data, that a tip of an index finger of the hand 130A is in contact with a tip of a thumb of the hand 130A and that the hand 130A is within a field-of-view of the HMD 102. To illustrate, a hand is within a field-of-view of the HMD 102 when a front outside face 103 of the HMD 102 is pointing in a direction of the hand. As another example, the processor of the computing device determines, from the image data, that a tip of one or more fingers of the hand 130B are in contact with a thumb of the hand 130B and that the hand 130B is within the field-of-view of the HMD 102.

Upon analyzing the positions and orientations of the hands 130A and 130B and of the HMD 102, the processor of the computing device generates image data to be rendered on the HMD 102. For example, upon determining that the hands 130A and 130B are within the field-of-view of the HMD 102, that an index finger of the hand 130A is in contact with the thumb of the hand 130A, and that an index finger of the hand 130B is in contact with the thumb of the hand 130B, the processor of the computing device generates image data to be rendered to display the image 108A and the image 108B within a scene 202A. A size of the image 108A is proportional to a size of the hand 130A and a size of the image 108B is proportional to the size of the hand 130B. Moreover, a distance between the images 108A and 108B is proportional to a distance between the hands 130A and 130B. Also, relative positions between fingers within the image 108A is the same as relative positions between fingers of the hand 130A and relative positions between fingers within the image 108B is the same as relative positions between fingers of the hand 130B. To illustrate, when the fingers of the hand 130A are used to perform a pinch and hold gesture, the image 108A also indicates a pinch and hold gesture. As another illustration, when the fingers of the hand 130B is used to perform a pinch and hold gesture, the image 108B also indicates a pinch and hold gesture.

As another example of generating image data upon analyzing the positions and orientations of the hands 130A and 130B and of the HMD 102, the processor of the computing device determines, from image data captured using one or more cameras of the camera system, that when a hand moves at a position closer to a camera of the camera system compared to a previous position, an image of the hand becomes proportionally bigger within the scene 202A compared to a previous image of the hand. As yet another example, the processor of the computing device determines from image data captured using one or more cameras of the camera system, that when a hand moves away from a camera of the camera system compared to a previous position, an image of the hand becomes proportionally smaller within the scene 202A. As another example, the processor of the computing device determines, from image data captured using one or more cameras of the camera system, that when a hand rotates at an angle with respect to an axis, e.g., an x-axis, a y-axis, a z-axis, etc., having a reference point, e.g., origin (0, 0, 0), etc., located at a camera of the camera system, an image of the hand rotates at the angle within respect to a corresponding axis, e.g., an X-axis, a Y-axis, a Z-axis, etc., having a reference point, e.g., origin (0, 0, 0), etc., within a scene. It should be noted that the X-axis within a scene corresponds to the x-axis in the real-world space, the Y-axis within a scene corresponds to the y-axis in the real-world space, and the Z-axis within a scene corresponds to the z-axis in the real-world space.

The processor of the computing device sends via a communication device of the computing device and a computing device of the HMD 102 the image data for generating the images 108A and 108B to a processor of the HMD 102. The processor of the HMD 102 applies a rendering program to display the images 108A and 108B on one or more display screens, e.g., liquid crystal display (LCD) screens, light emitting diode (LED) display screens, plasma display screens, etc., of the HMD 102. In one embodiment, the images 108A and 108B are projected onto eyes of the user 106 instead of being displayed on one or more display screens of the HMD 102.

It should be noted that the communication device of the HMD 102 and the communication device of the computing device apply a wired or a wireless protocol to communicate data between each other. Examples of the wireless protocol include a Bluetooth protocol, a Wi-Fi protocol, etc. Examples of the wired protocol include a parallel transfer protocol, a serial transfer protocol, a universal serial bus (USB) protocol, etc.

The scene 202A is displayed on the HMD 102, e.g., on one or more display screens of the HMD 102, etc. In the scene 202A, the image 108A of the left hand 130A and the image 108B of the right hand 130B are displayed. For example, the processor of the computing device allows images 108A and 108B to interact with other objects, e.g., a mountain, a tree, etc., of the scene 202A. Examples of the other objects include a virtual animal, a real-time video of an animal, a virtual user, a real-time video of a user, a virtual inanimate object, a real-time view of an inanimate object, a virtual background, a real-time video of a background, etc. As another example, the processor of the computing device enables overlay of the images 108A and 108B onto remaining objects within the scene 202A. As yet another example, the scene 202A is displayed when the user 106 is playing a game using the HMD 102 and the computing device. During the play of the game, the other objects are displayed within the scene 202A. Moreover, during the play of the game, the user 106 makes pinch and hold gestures using his/her hands 130A and 130B, and the pinch and hold gestures are captured as image data by the camera system to display the images 108A and 108B within the scene 202A.

The processor of the computing device determines from the image data captured using the camera system whether a pinch and hold gesture is performed by each hand 130A and 130B of the user 106. For example, when the processor of the computing device determines from the image data captured using the camera system that one or more fingers of a hand of the user 106 are in contact with a thumb of the hand, the processor determines that a pinch gesture is performed using the hand. As another example, the processor of the computing device determines that a pinch and hold gesture is performed using a hand when, from the image data captured using the camera system, it is determined that the user 106 pinches the hand for greater than a pre-determined amount of time.

Moreover, the processor of the computing device generates data for rendering a cue, within the scene 202A, at a location of a point of contact between one or more fingers of an image of a hand of the user 106 and a thumb of the image when the processor determines that a pinch and hold gesture is performed with the hand. For example, a cue 110A is displayed, within the scene 202A, at a location L1 of a point of contact between a finger of the image 108A and a thumb of the image 108A. To further illustrate, the cue 110A surrounds the point of contact between a finger of the image 108A and a thumb of the image 108A. As another illustration, a ripple effect is shown at the point of contact between a finger of the image 108A and a thumb of the image 108A. Ripples are displayed to origin at the location L1 and flow away from the location L1. As yet another illustration, there is a change in texture or shade or color displayed as the cue 110A in the scene 202A. As another example, a cue 110B is displayed, within the scene 202A, at a location L2 of a point of contact between a finger of the image 108B and a thumb of the image 108B. To further illustrate, the cue 110B surrounds the point of contact between a finger of the image 108B and a thumb of the image 108B. As another illustration, a ripple effect is shown at the point of contact between a finger of the image 108B and a thumb of the image 108B. Ripples are displayed to origin at the location L2 and flow away from the location L2. As yet another illustration, there is a change in texture or shade or color displayed as the cue 110B in the scene 202A.

In addition to generating data for rendering cues 110A and 110B when pinch and hold gestures are performed by the hands 130A and 130B, the processor of the computing device activates pinnings of the scene 202A and the pinnings are activated to fix the scene 202A to locations L1 and L2.

For example, the processor of the computing device creates a link between the location L1 and the scene 202A and another link between the location L2 and the scene 202A so that the scene 202A moves according to movement of the images 108A and 108B. The images 108A and 108B move according to movement of the hands 130A and 130B.

In one embodiment, the processor of the computing device activates pinnings of the scene 202A without generating data for rendering the cues 110A and 110B. For example, when pinch and hold gestures are performed using the hands 130A and 130B, the cues 110A and 110B are not generated and the scene 202A is fixed to the locations L1 and L2. As another example, the cues 110A and 110B are not displayed and data regarding the cues 110A and 110B is not generated when pinch and hold gestures are performed by the hands 130A and 130B.

In one embodiment, a point of contact between one or more fingers of an image of a hand and a thumb of the image of the hand is at a location at any point on a scene.

In an embodiment, when a cue is displayed within a scene or a pinch and hold gesture is determined to be performed, audio data for outputting a sound is generated by the processor of the computing device and provided to the HMD 102 for audio output with, e.g., synchronous to, etc., the display of the cue.

In one embodiment, instead of or in addition to audio data, other types of output, e.g., a sense output, a touch output, a feel output, etc., are provided to the user 106 when a cue is displayed within a scene or a pinch and hold gesture is determined to be performed. For example, the HMD 102 includes various compartments and each compartment stores a liquid or gas that has a scent. For example, when a cue is rendered on the HMD 102 or a pinch and hold gesture is determined to be performed, the processor of the HMD 102 receives a signal from the processor of the computing device to provide a sense output and/or a taste output to the user 106. Upon receiving the signal, the processor of the HMD 102 controls a driver, e.g., transistor, group of transistors, etc., of the HMD 102. The driver controls a motor of the HMD 102 to open a compartment for a time period to provide a scent and/or taste to the user 106 and then to close the compartment after the time period. As another example, when a cue is rendered on the HMD 102 or a pinch and hold gesture is determined to be performed, the processor of the HMD 102 receives a signal from the processor of the computing device to provide a touch output to the user 106. Upon receiving the signal, the processor of the HMD 102 sends a signal to a driver that is coupled to a haptic feedback device, e.g., a vibration motor, a tactile actuator, etc. The driver drives the haptic feedback device to move, e.g., vibrate, contract, expand, etc., the HMD 102 to provide haptic feedback to the user 106. The haptic feedback is an example of a touch sensation provided to the user 106.

In one embodiment, the user 106 logs into his/her user account to receive access to a scene. For example, the user 106 provides user information, e.g., user name, password, etc., and the user information is authenticated by an authentication server. When the authentication server authenticates the user information, the authentication server sends an indication of the authentication via a computer network, e.g., the Internet, an Intranet, a combination of the Internet and an Intranet, etc., to the processor of the computing device. Upon receiving the indication of the authentication, the processor of the computing device sends data for rendering the scene 202A to the HMD 102. The processor of the HMD 102 applies a rendering computer software program to the data to render the scene 202A.

In an embodiment, the user account is a social network account that is stored on a social network server connected to the computer network or a game network account that is stored on a game server connected to the computer network. In a social network, users log into their respective user accounts and communicate with each other by posting messages within the social network server or commenting on the posts. In a game network, users log into their respective user accounts to play games with each other or with a processor.

Examples of a scene, described herein, include an augmented reality (AR) scene, a virtual reality (VR) scene, a scene from a video game, a scene from a real-world location, a real-time video of a place to visit, a real-time video of a hotel, non-game content, etc. To illustrate, in a scene, e.g., an interactive environment, etc., an avatar that represents the user 106 interacts with one or more other avatars that represents one or more other users in a shared network environment. As another illustration, in a scene, e.g., an interactive environment, etc., an image of a body part, e.g., face, hands, legs, etc., of the user 106 is shown and an image of a body part of another user is shown. Both the users interact, e.g., talk, chat, etc., with each other in real-time via the interactive environment. As yet another illustration, data for rendering a real-time video of a real-world location is accessed from a server via the network by the processor of the computing device. The processor of the computing device provides the data for rendering the real-time video to the HMD 102 for display of the real-time video on the HMD 102. As another illustration, image data that represents a body part of the user 106 is captured by a camera and the image data is provided from the camera to the processor of the computing device. The processor of the computing device provides the image data to the HMD 102 for display in a scene on the HMD 102.

In one embodiment, a scene includes an audio output with a display of interactive objects within the scene. For example, a scene includes words spoken by an avatar in a game scene. As another example, a scene includes sounds made by a vehicle.

In an embodiment, a display of a scene is combined with one or more of an audio output, a taste output, a feel output, and a smell output to immerse the user 106 in the scene.

In an embodiment, a scene is a computer-simulated environment that immerses the user 106 into the environment as if the user 106 is within the scene. For example, a scene provides the user 106 with sensory experiences, e.g., sight, touch, sound, smell, etc., so that the user 106 feels as if he/she is a part of the scene.

Examples of an object, described herein, within a scene include a part of the scene that is distinguishable from other parts of the scene. An object has a look and feel, e.g., a skin, texture, shade, shape, color, smell, taste, haptic feedback output, and/or an audio output. Examples of audio output include sound, pitch, lyrics, words, etc. For example, an object is an avatar, or part (e.g., hands, arms, etc.) of the avatar, or a ball, or a racquet, or a vehicle, or an animal, or a gun, or a wall, or text on a wall, or images on surfaces or things in an interactive environment, or any other item that is shown in a scene.

In an embodiment, proportional, as used herein, refers to a fraction. For example, a first amount is proportional to a second amount when the first amount is a fraction of the second amount. To illustrate, when the second amount is 6 centimeters, the first amount is 2 centimeters. As another illustration, when the second amount is 60 degrees, the first amount is 20 degrees.

It should be noted that the xyz co-ordinate system is a co-ordinate system in the real space and the XYZ co-ordinate system is a co-ordinate system in a scene. Moreover, an x-direction is a direction that is parallel to the x-axis, a y-direction is a direction parallel to the y-axis, and a z-direction is a direction parallel to the z-axis. Similarly, an X-direction is a direction that is parallel to the X-axis, a Y-direction is a direction parallel to the Y-axis, and a Z-direction is a direction parallel to the Z-axis.

Figure 2B:
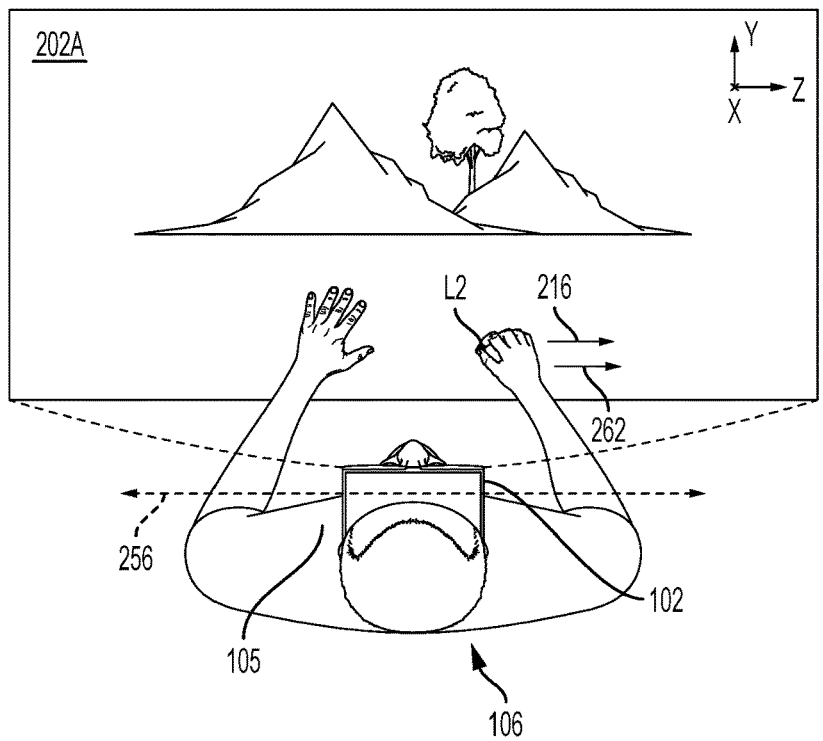
FIG. 2B illustrates a slide gesture to translate a scene, in accordance with one embodiment of the present disclosure.
Figure 2B:
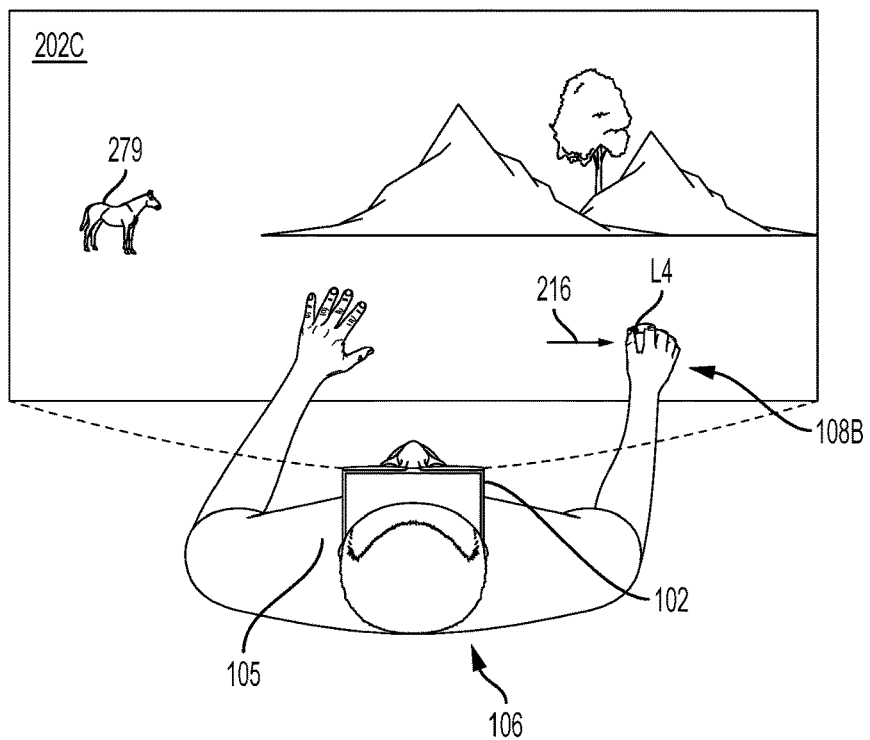
Figure 2C:
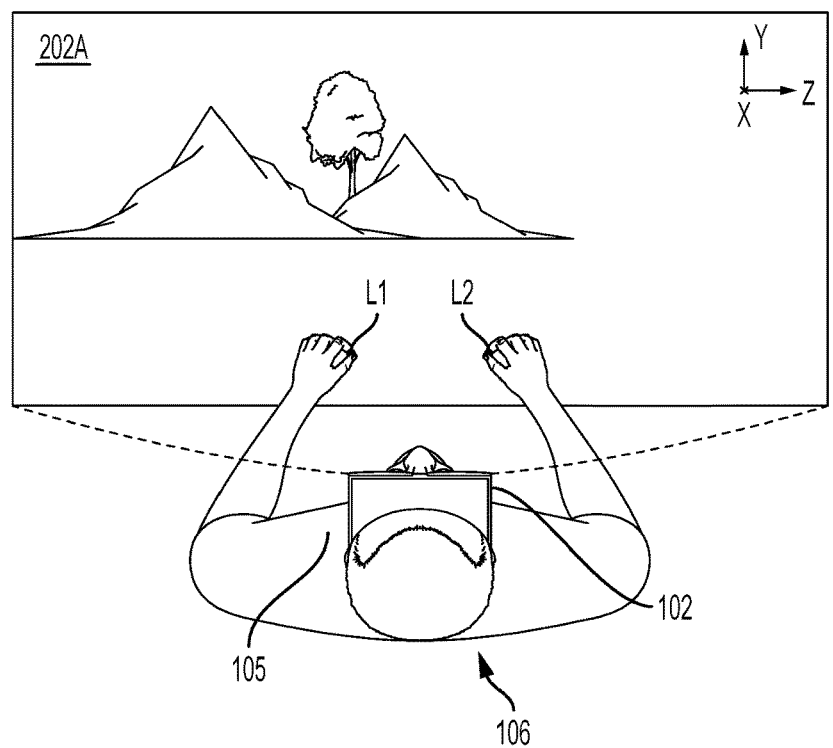
FIG. 2C illustrates a rotate gesture performed using one hand to rotate a scene, in accordance with one embodiment of the present disclosure.
Figure 2C:
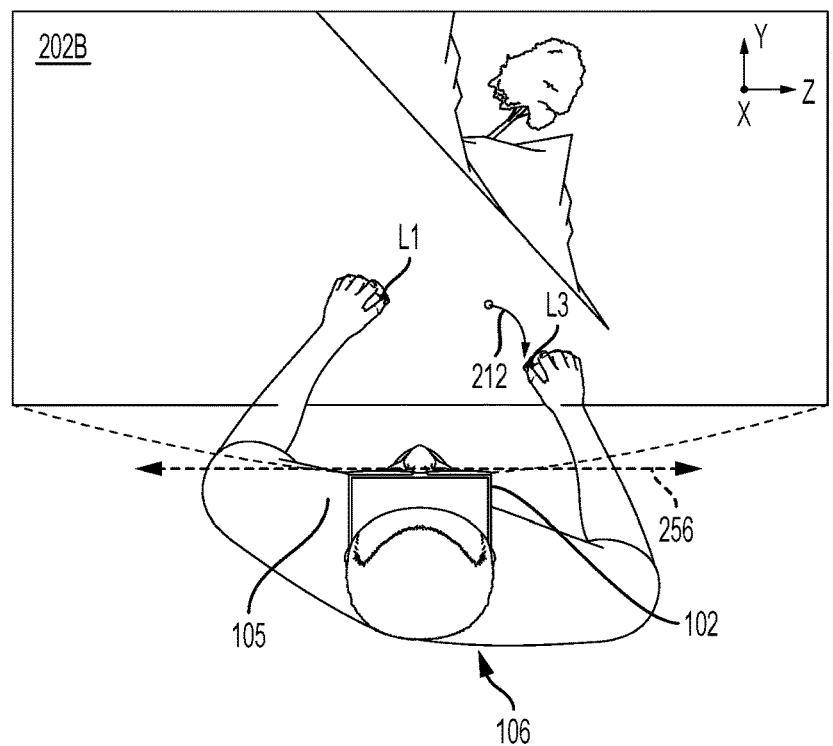

FIG. 2A is an embodiment of a table listing to illustrate various gestures performed by the user 106 (FIG. 1) and an effect of the gestures on a scene, e.g., the scene 202A (FIG. 1), etc., that is displayed on the HMD 102 worn by the user 106. For example, as illustrated with respect to FIG. 2E, it is determined by the processor of the computing device from image data of the left hand 130A of the user 106 (FIG. 1) and image data of the right hand 130B of the user 106 that pinch and hold gestures are performed by both the hands 130A and 130B of the user 106. Upon determining that pinch and hold gestures are performed using hands 130A and 130B by the user 106, the processor of the computing device determines from image data of the hands 130A and 130B whether a pull-in gesture illustrated in line item a in FIG. 2A or a push-out gesture illustrated in line item b in FIG. 2A is performed by the user 106. To illustrate, the processor of the computing device determines whether hands 130A and 130B move in a direction 258 away from and substantially perpendicular, e.g., perpendicular, etc., to an axis 256 that is parallel to a width of a torso 105 of the user 106 or in a direction towards 260 and substantially perpendicular to the axis 256. It should further be noted that in one embodiment, a direction is substantially perpendicular to the axis 256 when the direction is within a pre-determined angle, e.g., 60 degrees, 90 degrees, an angle between 45 degrees and 90 degrees, etc., from the axis 256. Upon determining that the hands 130A and 130B move in the direction 258, the processor of the computing device determines that the push-out gesture is performed and generates data for zooming-out the scene 202A. When the scene 202A is zoomed-out, sizes of objects, e.g., mountains, trees, etc., within the scene 202A are increased by the processor of the computing device compared to sizes of the objects in the scene 202A to generate data for rendering a scene 252B. On the other hand, upon determining that the hands 130A and 130B move in the direction 260, the processor of the computing device determines that the pull-in gesture is performed and generates data for zooming-in the scene 202A. When the scene 202A is zoomed-in, sizes of objects, e.g., mountains, trees, etc., within the scene 202A are increased by the processor of the computing device compared to sizes of the objects in the scene 202A to generate data for rendering a scene 252A.

As another example, upon determining that pinch and hold gestures are performed using hands 130A and 130B by the user 106, the processor of the computing device determines from image data of the hands 130A and 130B whether a pull apart gesture illustrated in line item c in FIG. 2A or a push together gesture illustrated in line item d in FIG. 2A is performed by the user 106. To illustrate, when the processor of the computing device determines from image data captured using the camera system that the hands 130A and 130B move in a direction 262 away from the HMD 102 and substantially parallel, e.g., parallel, etc., to the axis 256, the processor of the computing device determines that the pull apart gesture is performed by the user 106. It should further be noted that in one embodiment, a direction is substantially parallel to the axis 256 when the direction is within a pre-determined angle, e.g., 45 degrees, 30 degrees, an angle between 0 degrees and 45 degrees, etc., from the axis 256. Upon determining that the pull apart gesture is performed, the processor of the computing device determines to zoom-in the scene 202A and to generate data for rendering the scene 252A. As another illustration, when the processor of the computing device determines from image data captured using the camera system that the hands 130A and 130B move in a direction 264 towards the HMD 102 and substantially parallel, e.g., parallel, etc., to the axis 256, the processor of the computing device determines that the push together gesture is performed by the user 106. Upon determining that the push together gesture is performed, the processor of the computing device determines to zoom-out the scene 202A and to generate data for rendering the scene 252B.

In an embodiment, an amount of zoom-in or zoom-out applied by the processor of the computing device to a scene is proportional to an amount of movement of the hands 130A and 130B of the user 106. For example, upon determining from image data regarding hands 130A and 130B of the user 106 and captured by the camera system that the hands 130A and 130B traveled a first distance, the processor of the computing device zooms-in or zooms-out by a first scale compared to a preceding scene, e.g., the scene 202A, etc. Upon determining from image data regarding hands 130A and 130B of the user 106 and captured by the camera system that the hands 130A and 130B traveled a second distance, the processor of the computing device zooms-in or zooms-out by a second scale compared to the preceding scene. When the first distance is greater than the second distance, the first scale is greater than the second scale and when the second distance is greater than the first distance, the second scale is greater than the first scale.

Figure 2D:
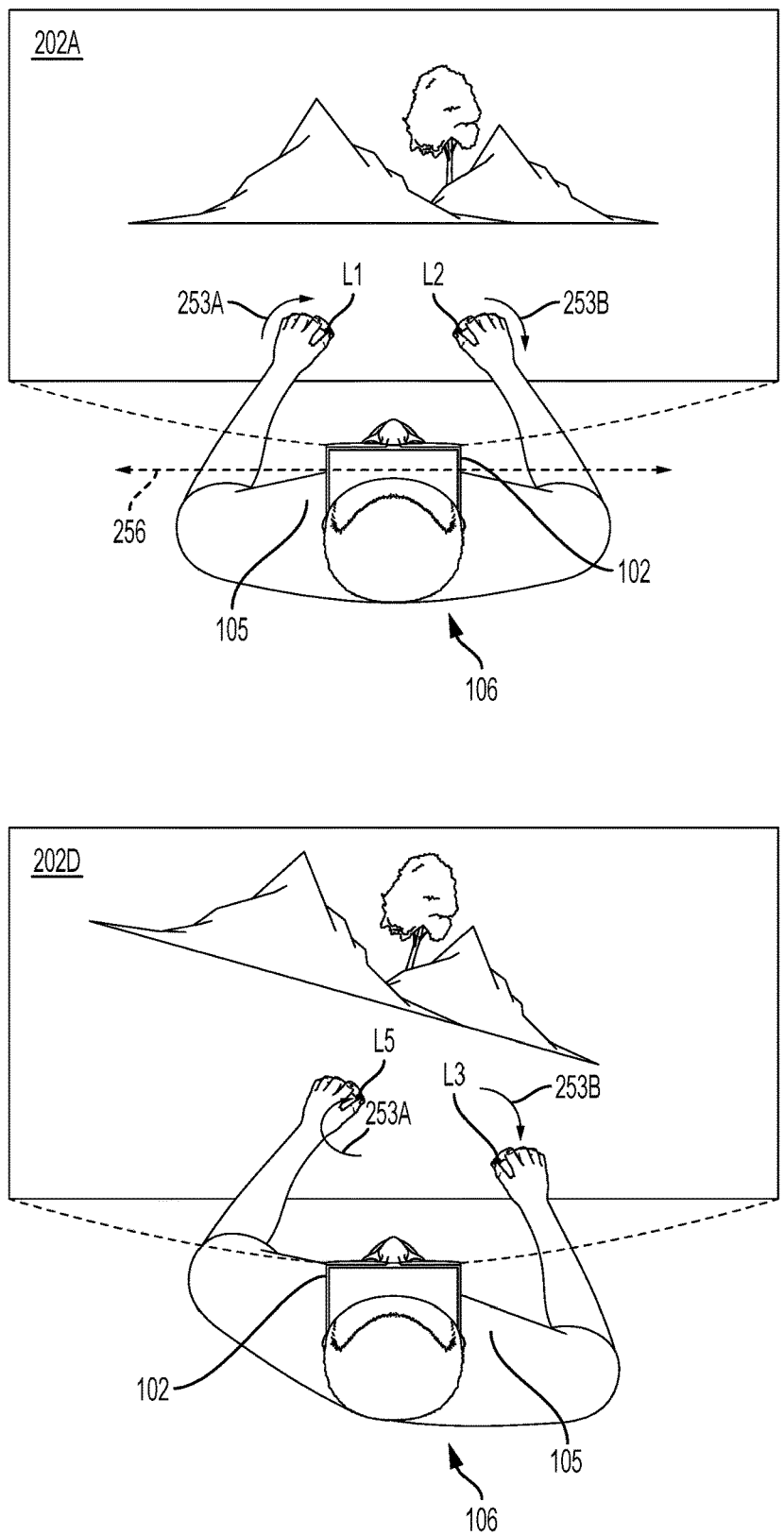
FIG. 2D illustrates a rotate gesture performed using both hands to rotate a scene, in accordance with one embodiment of the present disclosure.
Figure 2E:
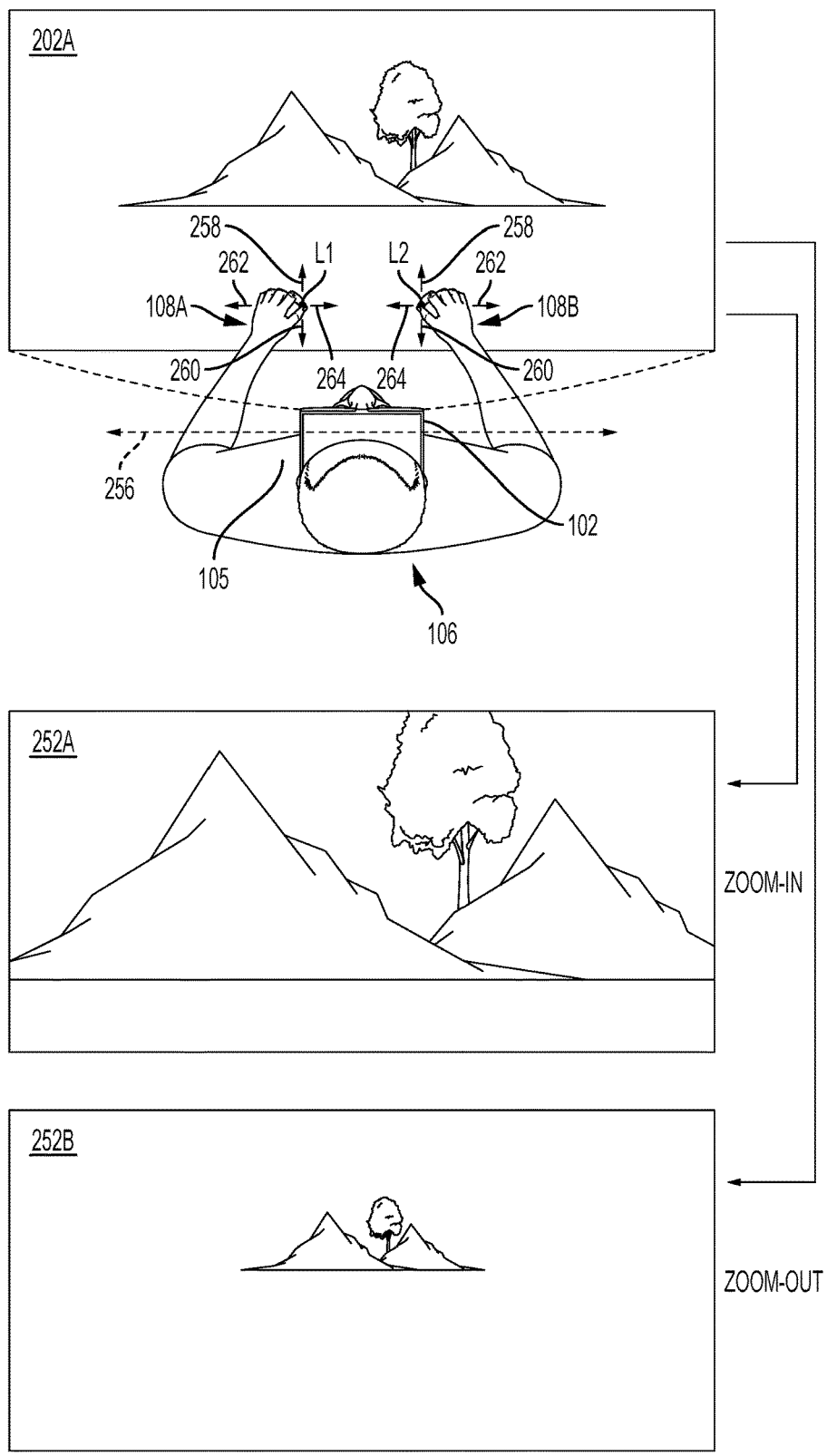
FIG. 2E illustrates various gestures performed using both hands to zoom-in and zoom-out a scene, in accordance with one embodiment of the present disclosure.

As another example, with reference to FIG. 2D, upon determining that pinch and hold gestures are performed using hands 130A and 130B by the user 106, the processor of the computing device determines from image data of the hands 130A and 130B whether a rotate gesture 253A is performed by the left hand 130A around an axis that is substantially perpendicular to the axis 256 in synchronization with, e.g. at the same time, substantially at the same time, etc., a rotate gesture 253B performed by the right hand 130B around an axis substantially perpendicular to the axis 256. The rotate gestures by both hands are illustrated in line item e in FIG. 2A. To illustrate, referring back to FIG. 2D, the processor of the computing device determines whether a rotate gesture is performed by a hand of the user 106 within a pre-determined amount of time after the other hand performs a rotate gesture to determine that both the hands perform rotate gestures at substantially the same time. As another illustration, the processor of the computing device determines from image data captured using the camera system that a rotate gesture 253A is performed by the left hand 130A of the user 106 so that the scene 202A is pinned at a location L5 from the location L1 and that a rotate gesture 253B is performed by the right hand 130B of the user 106 so that the scene 202A is pinned at a location L3 from the location L2. As another illustration, the processor of the computing device determines from image data captured using the camera system whether an orientation of a hand of the user 106 changes by greater than a pre-determined amount in a substantial clockwise or a substantial counter-clockwise direction around an axis that is substantially perpendicular to the axis 256. It should be noted that in one embodiment, an axis is substantially perpendicular to the axis 256 when the axis forms a pre-determined angle, e.g., 90 degrees, 60 degrees, an angle between 45 degrees and 90 degrees, etc., with respect to the axis 256. Moreover, it should be noted that in an embodiment, a substantial clockwise direction around an axis is a direction within a variance or a standard deviation of a clockwise direction around the axis. Also, it should be noted that in an embodiment, a substantial counter-clockwise direction around an axis is a direction within a variance or a standard deviation of a counter-clockwise direction around the axis. Upon determining that the amount of orientation of a hand of the user 106 changes by greater than a pre-determined amount in a substantial clockwise or a substantial counter-clockwise direction around an axis that is substantially perpendicular to the axis 256, the processor of the computing device determines that a rotate gesture is performed by the hand.

Upon determining that the rotate gestures 253A and 253B are performed by the hands 130A and 130B, the processor of the computing device identifies whether the hands rotate in a clockwise or a counter-clockwise direction. Upon identifying that the hands 130A and 130B rotate in the clockwise direction, the processor of the computing device generates data for rendering a scene 202D in which objects of the scene 202A are rotated in the clockwise direction compared to orientation of the objects in the scene 202A. On the other hand, upon identifying that the hands 130A and 130B rotate in the counter-clockwise direction, the processor of the computing device generates data for rendering another scene in which objects of the scene 202A are rotated in a counter-clockwise direction compared to orientation of the objects in the scene 202A.

In one embodiment, an amount, e.g., degree, etc., of rotation of objects within the scene 202A is proportional to an amount, e.g., degree, etc., of movement, e.g., clockwise movement, counter-clockwise movement, etc., of the hand 130A of the user 106 and to an amount, e.g., degree, etc., of movement, e.g., clockwise movement, counter-clockwise movement, etc., of the hand 130B of the user 106. For example, the processor of the computing device determines that an object of the scene 202A be rotated by a first degree when the hand 130A moves in a clockwise direction by a first amount and the hand 130B moves in the clockwise direction by a second amount. The second amount is determined by the processor of the computing device to be within a pre-determined range of the first amount. The processor of the computing device further determines that an object of the scene 202A be rotated by a second degree when the hand 130A moves in a clockwise direction by a third amount and the hand 130B moves in the clockwise direction by a fourth amount. The fourth amount is determined by the processor of the computing device to be within a pre-determined range of the third amount. When the third amount is greater than the first amount and the fourth amount is greater than the second amount, the second degree is greater than the first degree. Moreover, when the first amount is greater than the third amount and the second amount is greater than the fourth amount, the first degree is greater than the second degree.

As another example, with reference to FIG. 2C, upon determining that a pinch and hold gesture is performed using both hands of the user 106, the processor of the computing device determines from image data of the hands 130A and 130B whether a rotate gesture 212 in a clockwise direction is performed by one hand, e.g., right hand 130B, etc., with respect to an axis that is substantially perpendicular to the axis 256 while the left hand 130A is substantially at the location L1. The pinch and hold and rotate gesture performed by one hand when a pinch and hold gesture is performed by another hand is illustrated in line item f of FIG. 2A. In one embodiment, referring back to FIG. 2C, the processor of the computing device determines that the left hand 130A is substantially at the location L1 upon determining that the left hand 130A is within a pre-determined distance, e.g., (X, Y, Z) distance, from the location L1. Upon determining that the rotate gesture 212 in a substantial clockwise direction is performed by the right hand 130B and the left hand 130A is substantially at the location L1, the processor of the computing device generates data for rotating the scene 202A in a clockwise direction with respect to the location L1 to generate data for the scene 202B. To illustrate, the scene 202A is rotated as being hinged, e.g., fixed, etc., with respect to the location L1.

It should be noted that although the preceding example is described with respect to a clockwise rotation, one of ordinary skill in the art is capable of applying the example when the right hand 130B is moved to perform a rotate gesture in a counter-clockwise direction instead of a clockwise direction. For example, upon determining that a rotate gesture is performed by the right hand 130B in a counter-clockwise direction, the processor of the computing device generates data for rotating the scene 202A in a counter-clockwise direction to generate data for a scene.

It should be noted that in one embodiment, an amount of rotation of the scene 202A is proportional to an amount of rotation of the rotate gesture 212. For example, the processor of the computing device calculates from image data captured using the camera system a first amount of rotation of the right hand 130B with respect to an axis that is substantially perpendicular to the axis 256. Moreover, the processor of the computing device rotates the scene 202A by a first degree around the X axis upon determining that the first amount of rotation is performed. In this example, the processor of the computing device further calculates from image data captured using the camera system a second amount of rotation of the right hand 130B with respect to the axis substantially perpendicular to the axis 256. The processor of the computing device rotates the scene 202A by a second degree around the X axis upon determining that the second amount of rotation is performed. When the first amount is greater than the second amount, the first degree is greater than the second degree and when the second amount is greater than the first amount, the second degree is greater than the first degree.

It should be noted that although the embodiment described with reference to FIG. 2C is described using rotation of the right hand 130B, one of ordinary skill in the art would recognize that the embodiment applies to a situation in which the left hand 130A that performs a pinch and hold gesture is rotated instead of the right hand 130B while the right hand 130B is used to perform a pinch and hold gesture. For example, upon determining that a pinch and hold gesture and a rotate gesture is performed by the left hand 130A and the right hand 130B is substantially at the location L2, the processor of the computing device generates data for rotating the scene 202A in a counterclockwise direction with respect to the location L2 to generate data for a scene.

In one embodiment, movement of the hands 130A and 130B in the direction 262 increases separation, e.g., distance, etc., between the hands and movement of the hands 130A and 130B in the direction 264 decreases separation between the hands.

Figure 2F:
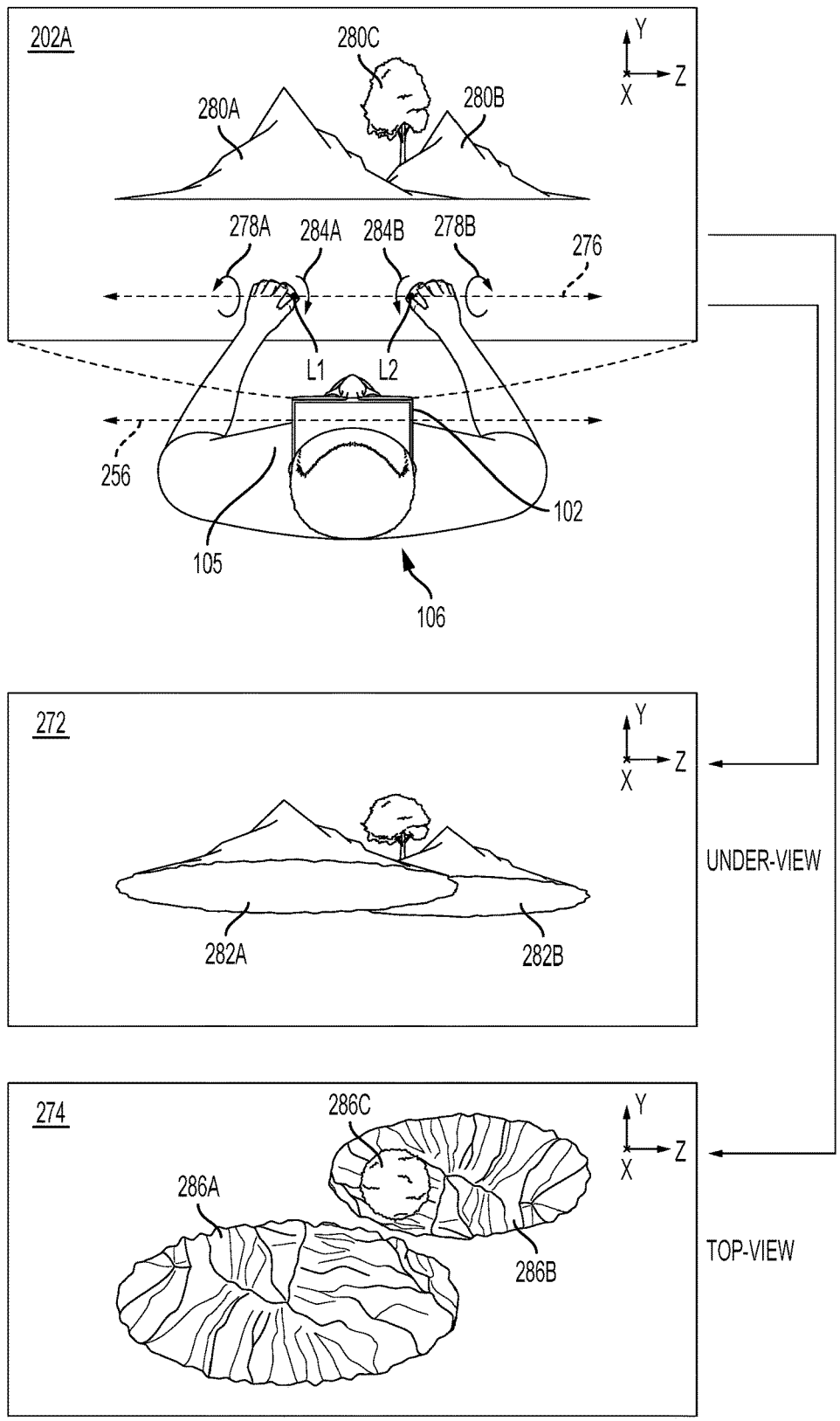
FIG. 2F illustrates various gestures performed using both hands to tilt a scene, in accordance with one embodiment of the present disclosure.

As yet another example, with reference to line items g and h in FIG. 2A and with reference to FIG. 2F, upon determining that pinch and hold gestures are performed using hands 130A and 130B by the user 106, the processor of the computing device determines from image data of the hands 130A and 130B whether a rotate gesture 278A is performed by the left hand 130A in a clockwise direction around an axis 276 that is substantially parallel to the axis 256 and a rotate gesture 278B is performed by the right hand 130B in a clockwise direction around the axis 276. For example, the axis 276 that is substantially parallel to the axis 256 is an imaginary axis that passes between and through the hands 130A and 130B of the user 106. In an embodiment, the axis 276 is substantially parallel to the axis 256 when the axis 276 forms an angle within a pre-determined range, e.g., less than 90 degrees, less than 45 degrees, less than 60 degrees, etc., with respect to the axis 256. Upon determining that the rotate gestures 278A and 278B are performed, the processor of the computing device determines to tilt, e.g., rotate, etc., objects 280A, 280B, and 280C within the scene 202A in a clockwise direction around the Z axis to generate data for displaying bottom portions 282A and 282B of the objects 280A and 280B, and a bottom portion of the object 280C. The bottom portions 282A and 282B, and the bottom portion of the object 282C are not displayed in the scene 202A. The data for displaying the bottom portions 282A and 282B, and the bottom portion of the object 280C is sent from the processor of the computing device to the processor of the HMD 102 and is rendered by the processor of the HMD 102 to generate a scene 272 on one or more display screens of the HMD 102.

As another example, upon determining that pinch and hold gestures are performed using hands 130A and 130B by the user 106, the processor of the computing device determines from image data of the hands 130A and 130B whether a rotate gesture 284A is performed by the left hand 130A in a counter-clockwise direction around the axis 276 and a rotate gesture 284B is performed by the right hand 130B in a counter-clockwise direction around the axis 276. Upon determining that the rotate gestures 284A and 284B are performed, the processor of the computing device determines to tilt, e.g., rotate, etc., objects 280A, 280B, and 280C within the scene 202A in a counter-clockwise direction around the Z axis to generate data for displaying top portions 286A, 286B, and 286C of the objects 280A, 280B, and 280C. The top portions 286A, 286B, and 286C are not displayed in the scene 202A. The data for displaying the top portions 286A, 286B, and 286C is sent from the processor of the computing device to the processor of the HMD 102 and is rendered by the processor of the HMD 102 to generate a scene 274 on one or more display screens of the HMD 102.

It should be noted that the clockwise and counter-clockwise directions described with reference to FIG. 2F are in a direction of the z-axis.

In an embodiment, an amount, e.g., a degree, etc., of rotation of the objects 280A, 280B, and 280C is proportional to amounts, e.g., degrees, etc., of rotation of rotate gestures, e.g., the rotate gestures 278A and 278B, the rotate gestures 284A and 284B, etc. For example, the processor of the computing device determines that the rotate gesture 284A has a first degree of rotation and the rotate gesture 284B has a second degree of rotation. The second degree is determined by the processor of the computing device to be within a pre-determined amount from the first degree. The processor of the computing device further determines that an amount of rotation of the objects 280A, 280B, and 280C is of a first amount when the first and second degrees of rotations occur. Moreover, the processor of the computing device determines that the rotate gesture 284A has a third degree of rotation and the rotate gesture 284B has a fourth degree of rotation. The fourth degree is determined by the processor of the computing device to be within a pre-determined amount from the third degree. The processor of the computing device further determines that an amount of rotation of the objects 280A, 280B, and 280C is of a second amount when the third and fourth degrees of rotations occur. When the first degree is greater than the third degree and the second degree is greater than the fourth degree, the first amount is greater than the second amount. When the third degree is greater than the first degree and the fourth degree is greater than the second degree, the second amount is greater than the first amount.

In an embodiment, an object, e.g., the object 280A, the object 280B, the object 280C, etc., within the scene 202A is displayed as a two-dimensional object. When rotate gestures are performed by the hands 130A and 130B for rotating the two-dimensional object with respect to the Z axis, the processor of the computing device generates data for converting the two-dimensional (2D) object into a three-dimensional (3D) object for display in the scene 272.

In one embodiment, an object, e.g., the object 280A, the object 280B, the object 280C, etc., is displayed as a three-dimensional object in the scenes 202A and 272 before and after rotation of the three-dimensional object.

In an embodiment, an object, e.g., the object 280A, the object 280B, the object 280C, etc., is displayed as a two-dimensional object in the scenes 202A and 272 before and after rotation of the two-dimensional object. For example, a bottom edge of the object 280A is displayed in the scene 272 instead of the bottom three-dimensional portion 282A. The bottom edge is not displayed in the scene 202A. As another example, top edges of the object 280A are displayed in the scene 274 instead of the three-dimensional top portion 286A. The top edges are not displayed in the scene 202A.

As yet another example, with reference to line item I in FIG. 2A and with reference back to FIG. 2C, upon determining that a pinch and hold gesture is performed using a first hand, e.g., the right hand 130B, etc., by the user 106 and a pinch and hold gesture is not performed using a second hand, e.g., the left hand 130A, etc., of the user 106, the processor of the computing device determines from image data of the hands 130A and 130B whether the rotate gesture 212 is performed by the first hand in a clockwise direction with respect to an axis that is substantially perpendicular to the axis 256. Upon determining that the rotate gesture 212 is performed by the first hand in a clockwise direction, the processor of the computing device generates data for rotating the scene 202A in a clockwise direction to generate data for the scene 202B.

It should be noted that although the preceding example is described with respect to a clockwise rotation, one of ordinary skill in the art is capable of applying the example when the first hand is moved to perform a rotate gesture in a counter-clockwise direction instead of a clockwise direction. For example, upon determining that a rotate gesture is performed by the first hand in a counterclockwise direction, the processor of the computing device generates data for rotating the scene 202A in a counter-clockwise direction to generate data for a scene.

As another example, with reference to line item j in FIG. 2A and with reference to FIG. 2B, upon determining that a pinch and hold gesture is performed using a first hand, e.g., the right hand 130B, etc., by the user 106 and a pinch and hold gesture is not performed using a second hand, e.g., the left hand 130A, etc., of the user 106, the processor of the computing device determines from image data of the hands 130A and 130B whether a slide gesture 216 is performed by the first hand in a direction, e.g., in a x-direction, in a y-direction, in a z-direction, a direction between the x and y directions, a direction between the x and z directions, a direction between the y and z direction, the direction 262 substantially parallel to the axis 256, etc., with respect to the reference co-ordinate, e.g., origin (0, 0, 0), etc., of the xyz co-ordinate system, etc. Upon determining that the slide gesture 216 is performed in the direction, the processor of the computing device determines to generate data to slide the scene 202A in the direction with respect to a reference co-ordinate, e.g., origin (0, 0, 0), etc., of the XYZ co-ordinate system. For example, when the user 106 slides the right hand 130B in the direction 262 substantially parallel to the axis 256, the processor of the computing device slides the scene 202A in the Z-direction. To illustrate, each object in the scene 202A slides in the Z-direction to generate data for a scene 202C. The data for the scene 202C is provided by the processor of the computing to the processor of the HMD 102 for display as the scene 202C on the HMD 102.

In an embodiment, an amount by which the scene 202A translates, e.g., slides, etc., is proportional to an amount by which a hand of the user 106B performing a slide gesture slides. For example, when the hand 130B slides by a first amount, the processor of the computing device generates data for sliding the image 108B by a second amount. The second amount is proportional, e.g., a fraction of, etc., of the first amount.

In one embodiment, the processor of the computing device generates data for displaying the image 108B so that a pinch and hold gesture is performed by the image 108B at a location L4.

In an embodiment, when the scene 202A is translated to display the scene 202C, objects not displayed within the scene 202A are displayed in the scene 202C. For example, the processor of the computing device determines that an amount of translation of the scene 202A is associated with a display of an object 279. The processor of the computing device provides data, e.g., shape, color, texture, position, orientation, look and feel, etc., for rendering the object 279 to the processor of the HMD 102 for displaying the object 279 in the scene 202C.

In one embodiment, a look and feel of an object includes a color of the object when displayed on the HMD 102, or a shape of the object when displayed on the HMD 102, or a font of the object when displayed on the HMD 102, or a texture of the object when displayed on the HMD 102, or a shade of the object when displayed on the HMD 102, or a feel provided to the user 106 by the object when displayed on the HMD 102, or a taste provided to the user 106 by the object when the object is displayed on the HMD 102, or a smell provided by the object to the user 106 when the object is displayed on the HMD 102, or a sound output from the object when the object is displayed on the HMD 102, or a combination of two or more thereof, etc.

In an embodiment, two scenes are viewable portions of a scene. For example, the scenes 202A and 202C are viewable portions of a scene.

As another example, with reference to line item k in FIG. 2A, upon determining that a pinch and hold gesture is performed using a first hand, e.g., the right hand 130B, etc., by the user 106 and a pinch and hold gesture is not performed using a second hand, e.g., the left hand 130A, etc., of the user 106, the processor of the computing device determines from image data of the hands 130A and 130B whether a release gesture is performed by the first hand followed by a double tap gesture. The release gesture is performed by the first hand following performance of a pinch and hold gesture by the first hand. For example, a pinch and hold gesture precedes a release gesture. An example of the release gesture is when none of fingers of the first hand are in contact with a thumb of the first hand. An example of a double tap gesture is when the user 106 extends his/her finger, e.g., index finger, etc., in a first direction, retracts the finger in a second direction opposite to the first direction, extends the finger again in the direction, and retracts the finger in the second direction. The release gesture precedes the double tap gesture. Upon determining that a pinch and hold gesture of the first hand is followed by the release gesture further followed by the double tap gesture, the processor of the computing device generates data for zooming-in a cued portion of the scene 202A without zooming-into the remaining portion of the scene 202A. The cue 110B is displayed as the cued portion. For example, the processor of the computing device increases a size of an object displayed in the cued portion without increase a size of objects in remaining portions of the scene 202A.

In one embodiment, upon determining that a pinch and hold gesture of the first hand is followed by the release gesture further followed by the double tap gesture, the processor of the computing device generates data for zooming-in all objects within the scene 202A.

As another example, with reference to line item l in FIG. 2A, upon determining that a pinch and hold gesture is performed using a first hand, e.g., the right hand 130B, etc., by the user 106 and a pinch and hold gesture is not performed using a second hand, e.g., the left hand 130A, etc., of the user 106, the processor of the computing device determines from image data of the hands 130A and 130B whether a slide gesture is performed by the first hand followed by a release gesture by the first hand further followed by a double tap gesture by the first hand. In this example, the pinch and hold gesture precedes the slide gesture, the slide gesture precedes the release gesture, and the release gesture precedes the double tap gesture. Upon determining that the slide gesture is performed, the processor of the computing device determines to slide the cue 110B in a direction in which the slide gesture is performed. For example, when the slide gesture is performed the direction 262 (FIG. 2B), the processor of the computing device determines to slide the cue 110B in the X-direction. Moreover, upon determining that the release and double tap gestures are performed after the slide gesture is performed, the processor of the computing device determines to zoom-in a portion of a scene within the cue 110B.

In one embodiment, an amount by which a cue slides is proportional to a distance traversed by a slide gesture for which the cue slides. For example, when the processor of the computing device determines that the hand 130B of the user 106 slides by a first distance, the processor of the computing device determines to slide the cue 110B by a second distance, which is a fraction of the first distance.

In one embodiment, the processor of the computing determines from the images of the hands 130A and 130B captured by the camera system whether the hands 130A and 130B are moving in a direction substantially parallel to the axis 256 while simultaneously moving in a direction substantially perpendicular to the axis 256. For example, the user 106 moves his/her hands 130A and 130B in the direction 258 and at the same time moves the hands in the direction 264. As another example, the user 106 moves the hands 130A and 130B in the direction 262 and concurrently moves the hands in the direction 260.

In the embodiment, the processor of the computing device identifies from the images of the hands 130A and 130B captured by the camera system a dominant motion between the movement in the direction substantially parallel to the axis 256 and the movement in the direction substantially perpendicular to the axis 256. For example, the processor of the computing device determines whether the movement in the direction 258 is greater by a pre-determined amount than an amount of movement in the direction 264. Upon determining that the movement in the direction 258 is greater by the pre-determined amount than the amount of movement in the direction 264, the processor identifies the movement in the direction 258 as the dominant motion. On the other hand, upon determining that the movement in the direction 264 is greater by the pre-determined amount than the amount of movement in the direction 258, the processor identifies the movement in the direction 264 as the dominant motion.

As another example, the processor of the computing device determines whether the movement in the direction 262 is greater by a pre-determined amount than the movement in the direction 258. Upon determining that the movement in the direction 262 is greater by the pre-determined amount than the amount of movement in the direction 258, the processor identifies the movement in the direction 262 as the dominant motion. On the other hand, upon determining that the movement in the direction 258 is greater by the pre-determined amount than the amount of movement in the direction 262, the processor identifies the movement in the direction 258 as the dominant motion.

As yet another example, the processor of the computing device determines whether acceleration of the movement in the direction 262 is greater by a pre-determined level than acceleration of the movement in the direction 258. Upon determining that acceleration of the movement in the direction 262 is greater by the pre-determined level than acceleration of the amount of movement in the direction 258, the processor identifies the movement in the direction 262 as the dominant motion. On the other hand, upon determining that acceleration of the movement in the direction 258 is greater by the pre-determined level than acceleration of the movement in the direction 262, the processor identifies the movement in the direction 258 as the dominant motion.

Further, in the embodiment, the processor of the computing device determines a submissive motion from the dominant motion. For example, when the user 106 is performing movements of the hands 130A and 130B in the directions 258 and 264 simultaneously, the processor identifies movement of the hands in the direction 264 to be the dominant motion. The other motion, which is the movement in the direction 258 is determined to be the submissive motion. As another example, when the user 106 is performing movements of the hands 130A and 130B in the directions 258 and 262 simultaneously, the processor identifies movement of the hands in the direction 262 to be the dominant motion. The other motion, which is the movement in the direction 258 is determined to be the submissive motion.

Moreover, in the embodiment, the processor of the computing devices enables a change in a size of the scene 202A according to the dominant motion while ignoring the submissive motion. For example, upon identifying that the movement in the direction 258 is the dominant motion and the movement in the direction 264 is the submissive motion, the processor determines to change in the scene 202A according to the movement in the direction 258 and does not any change to the scene 202A according to the movement in the direction 264. To illustrate, the processor of the computing device determines to zoom-out the scene 202A in proportion to the amount of movement in the direction 258 and determines not to zoom-out the scene 202A according to the movement in the direction 264. On the other hand, upon identifying the movement in the direction 264 to be the dominant motion and the movement in the direction 258 to be the submissive motion, the processor determines to change in the scene 202A according to the movement in the direction 264 and does not make any change to the scene 202A according to the movement in the direction 258. To illustrate, the processor of the computing device determines to zoom-out the scene 202A in proportion to the amount of movement in the direction 264 and determines not to zoom-out the scene 202A according to the movement in the direction 258.

As another example, upon identifying the movement in the direction 262 to be the dominant motion and the movement in the direction 258 to be the submissive motion, the processor determines to change in the scene 202A according to the movement in the direction 262 and does not enable modifying the scene 202A according to the movement in the direction 258. To illustrate, the processor of the computing device determines to zoom-in the scene 202A in proportion to the amount of movement in the direction 262 and determines not to zoom-out the scene 202A according to the movement in the direction 258. the other hand, upon determining that the movement in the direction 258 is the dominant motion and the movement in the direction 262 is the submissive motion, the processor determines to change in the scene 202A according to the movement in the direction 258 and does not enable modification to the scene 202A according to the movement in the direction 262. To illustrate, the processor of the computing device determines to zoom-out the scene 202A in proportion to the amount of movement in the direction 258 and determines not to zoom-in the scene 202A according to the movement in the direction 262.

In an embodiment, the processor of the computing determines from the images of the hands 130A and 130B captured by the camera system whether the hands 130A and 130B are moving in a direction substantially parallel and/or substantially perpendicular to the axis 256 while simultaneously rotating around an axis that is substantially parallel to the axis 256. For example, the user 106 moves his/her hands 130A and 130B in the direction 258 and at the same time performs the rotate gestures 278A and 278B. As another example, the user 106 moves the hands 130A and 130B in the direction 262 and concurrently performs the rotate gestures 284A and 284B.

In the embodiment, the processor of the computing device identifies from the images of the hands 130A and 130B captured by the camera system a dominant motion between the movement in the direction substantially parallel to the axis 256 and/or the movement in the direction substantially perpendicular to the axis 256 and rotate gestures of the hands 130A and 130B. For example, upon determining that the user 106 is performing the rotate gestures 278A and 278B and also moving the hands 130A and 130B in the direction 262 and/or the direction 258, the processor identifies the rotate gestures 278A and 278B to be a dominant motion of the hands. On the other hand, upon determining that the user 106 is not performing the rotate gestures 278A and 278B while moving the hands 130A and 130B in the direction 262 and/or the direction 258, the processor identifies the movement of the hands 130A and 130B in the direction 262 and/or the direction 258 to be the dominant motion.

Further, in the embodiment, the processor of the computing device determines a submissive motion from the dominant motion. For example, when the user 106 is moving the hands 130A and 130B in the directions 258 and 264, and is performing the rotate gestures 278A and 278B simultaneously, the processor identifies the rotate gestures 278A and 278B to be the dominant motion. The other motion, which is the movement in the directions 258 and 264, is determined to be the submissive motion. As another example, when the user 106 is moving the hands 130A and 130B in the direction 258 and is also performing the rotate gestures 278A and 278B, the processor identifies the rotate gestures 278A and 278B to be the dominant motion. The other motion, which is the movement in the direction 258, is determined to be the submissive motion.

Moreover, in the embodiment, the processor of the computing device enables a change in the scene 202A according to the dominant motion while ignoring the submissive motion. For example, upon identifying that the rotate gestures 278A and 278B is the dominant motion and the movement in the direction 258 is the submissive motion, the processor determines to tilt objects in the scene 202A according to the rotate gestures 278A and 278B and does not make any change to the scene 202A according to the movement in the direction 258. To illustrate, the processor of the computing device determines to tilt objects the scene 202A in proportion to the rotate gestures 278A and 278B and determines not to zoom-out the scene 202A according to the movement in the direction 258. As another example, upon identifying the movement in the direction rotate gestures 284A and 284B to be the dominant motion and the movement in the direction 262 to be the submissive motion, the processor determines to change in the scene 202A according to the rotate gestures 284A and 284B and does not make any change to the scene 202A according to the movement in the direction 262. To illustrate, the processor of the computing device determines to tilt objects in the scene 202A in proportion to the rotate gestures 284A and 284B and determines not to zoom-in the scene 202A according to the movement in the direction 262.

Figure 3A:
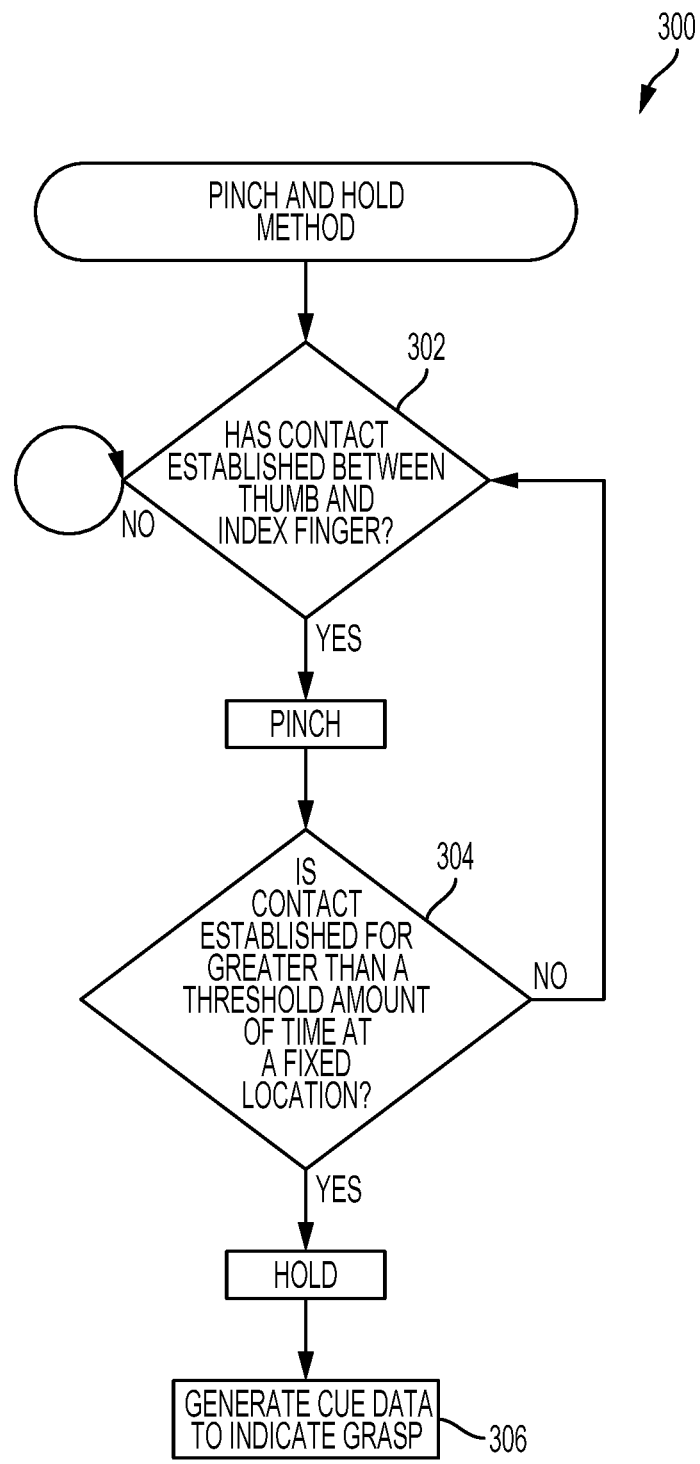
FIG. 3A is a flowchart of a method for illustrating a pinch and hold gesture, in accordance with one embodiment of the present disclosure.

FIG. 3A is a flowchart of an embodiment of a method 300 for illustrating a pinch and hold gesture. The method 300 is executed by the processor of the computing device. In an operation 302 of the method 300, it is determined whether contact is established between a thumb of a hand of the user 106 (FIG. 1) and one or more of remaining fingers of the hand of the user 106 to determine whether a pinch gesture is performed by the hand. For example, image data regarding the hand 130A (FIG. 1) is captured by a camera of the camera system and the image data is communicated via the wired or wireless protocol from the camera to a communication device of the computing device. The processor of the computing device receives the image data and analyzes the image data to determine whether a thumb of the hand 130A is in contact with one or more of the remaining fingers of the hand 130A. To illustrate, the processor of the computing device detects a thumb from the image data by comparing thumb data within the image data with pre-stored thumb data. The pre-stored thumb data includes a size of the thumb, a color of the thumb, a shape of the thumb, a texture of the thumb, a position of the thumb with respect to the remaining fingers, a position of the thumb with respect to a hand of the user 106, or a combination thereof, etc. Moreover, the processor of the computing device detects an index finger from the image data by comparing finger data within the image data with pre-stored index finger data. The pre-stored index finger data includes a size of the index finger, a color of the index finger, a shape of the index finger, a texture of the index finger, a position of the index finger of a hand of the user 106 with respect to the remaining fingers of the hand, a position of the index finger with respect to a hand of the user 106, or a combination thereof, etc. Upon determining that there is no distance remaining between the thumb data and the index finger data, the processor of the computing device determines that a thumb of a hand of the user 106 is in contact with one or more of remaining fingers of the hand and that a pinch gesture is performed by the hand.

As another example, the user 106 wears a glove that has finger segments for each finger of a hand of the user 106. Each finger segment includes one or more electrodes. An electrode of a thumb segment of the glove comes in contact with an electrode of a finger segment of the glove to generate a signal. The signal is sent via the wired or wireless communication protocol to a communication device of the computing device. Upon receiving the signal, the processor of the computing device determines that a pinch gesture is performed by a hand of the user 106.

Upon determining that a pinch gesture is performed, it is determined whether a contact between a thumb of a hand and one or more remaining fingers of the hand is established for more than a pre-determined amount of time and whether the contact is established at a location that is substantially fixed with respect to the xyz co-ordinate system. For example, the processor of the computing device analyzes image data received from a camera of the camera system to determine whether the image data indicates contact between a thumb of the hand 130A and an index finger of the hand for greater than a pre-determined amount of time. In one embodiment, an amount of time for comparison with the pre-determined amount of time is received from a clock that is coupled to the processor of the computing device. In an embodiment, an amount of time for comparing with the pre-determined amount of time is received from the computer network by the processor of the computing device. In one embodiment, the processor of the computing device calculates the amount of time. Upon determining that the image data indicates the contact for greater than the pre-determined amount of time, the processor of the computing device determines whether multiple locations of the contact are within a pre-determined range of a location, e.g., a location at which the contact is first determined to be established, the location L1, the location L2, etc., of the contact. Upon determining that the image data indicates the contact for greater than the pre-determined amount of time and that the multiple locations of the contact are within the pre-determined range, the processor of the computing device determines that a pinch and hold gesture is performed by the hand 130A. On the other hand, upon determining that the image data indicates the contact for less than the pre-determined amount of time or that the multiple locations of the contact are not within the pre-determined range, the processor of the computing device determines that a pinch and hold gesture is not performed by the hand 130A.

In one embodiment of the preceding example, the processor of the computing device determines whether the image data indicates the contact for greater than the pre-determined amount of time after determining that multiple locations of the contact are within the pre-determined range of the location of contact.

In an embodiment of the preceding example, the processor of the computing device determines whether the image data indicates the contact for greater than the pre-determined amount of time while, e.g., simultaneous with, etc., determining that multiple locations of the contact are within the pre-determined range of the location of contact.

In one embodiment of the preceding example, instead of using image data to determine whether a contact is established for greater than a pre-determined amount of time, the processor of the computing device determines whether signals indicating contact between a thumb of a hand of the user 106 and one or more of remaining fingers of the user 106 are received from electrodes of the gloves for greater than a pre-determined amount of time. Moreover, image data regarding finger segments of the glove is analyzed by the processor to determine whether multiple locations of the contact are within the pre-determined range of the location of contact. To illustrate, the processor of the computing device detects a thumb segment from the image data by comparing thumb segment data within the image data with pre-stored thumb segment data. The pre-stored thumb segment data includes a size of the thumb segment, a color of the thumb segment, a shape of the thumb segment, a texture of the thumb segment, a position of the thumb segment with respect to the remaining finger segments, a position of the thumb segment with respect to a hand of the user 106, or a combination thereof, etc. Moreover, in the illustration, the processor of the computing device detects an index finger segment from the image data by comparing index finger segment data within the image data with pre-stored index finger segment data. The pre-stored index finger segment data includes a size of the index finger segment, a color of the index finger segment, a shape of the index finger segment, a texture of the index finger segment, a position of the index finger segment with respect to the remaining finger segments, a position of the index finger segment with respect to a hand of the user 106, or a combination thereof, etc. Upon determining that signals indicating contact between the thumb segment of the glove and one or more of remaining finger segments of the glove worn by the user 106 are received from electrodes of the glove for greater than the pre-determined amount of time and upon determining that multiple locations of the contact are within the pre-determined range of the location of contact, the processor of the computing device determines that a pinch and hold gesture is performed by the hand of the user 106 on which the glove is worn. On the other hand, upon determining that signals indicating contact between the thumb segment of the glove and one or more of remaining finger segments of the glove worn by the user 106 are not received from electrodes of the glove for greater than the pre-determined amount of time or upon determining that multiple locations of the contact are not within the pre-determined range of the location of contact, the processor of the computing device determines that a pinch and hold gesture is not performed by the hand of the user 106 on which the glove is worn.

Upon determining that a pinch and hold gesture is performed by a hand of the user 106, in an operation 306 of the method 300, the processor of the computing device generates cue data to indicate a pinning between an image of the hand and a location, e.g., the location L1, the location L2, etc., in a scene displayed on the HMD 102 (FIG. 1).

In one embodiment, upon determining that a pinch and hold gesture is performed by a hand of the user 106, in an operation 306 of the method 300, greater than a pre-determined amount of time, the processor of the computing device generates cue data to indicate a pinning between an image of the hand and a location, e.g., the location L1, the location L2, etc., in a scene displayed on the HMD 102. For example, data for activating a visual representation of a cue is generated or identified by the processor of the computing device upon determining that a pinch and hold gesture is performed for greater than a pre-determined amount of time.

In an embodiment, the location in the scene at which the cue data is to be displayed is a location at which the image of the hand is located. To illustrate, the location in the scene at which the cue data is to be displayed is a location at which a thumb of an image of a hand of the user 106 is in contact with one or more fingers of the image of the hand. Examples of cue data include data for rendering a ripple effect, data for rendering a wrinkle effect, data for rendering a color change, data for rendering a shade change, data for rendering a texture change, audio data for generating a sound, or a combination of two or more thereof, etc. Examples of a sound include a dong sound, a click sound, a tap sound, etc.

The processor of the computing device sends the cue data to the processor of the HMD 102 for display on one or more display screens of the HMD 102.

Figure 3B:
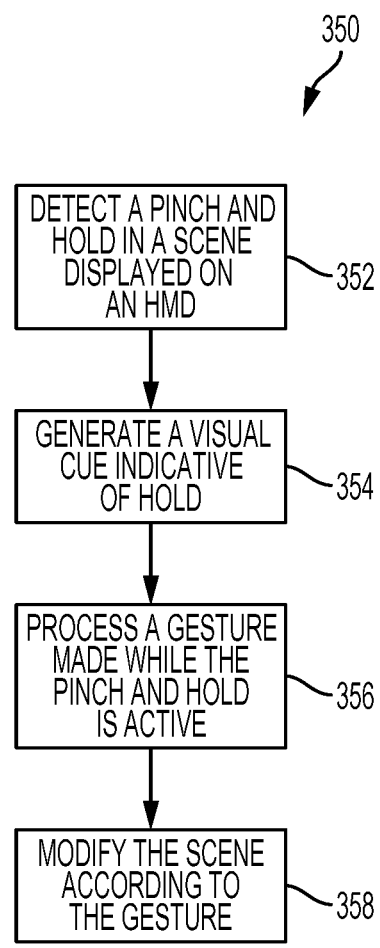
FIG. 3B is a flowchart of a method for modifying a scene according to a gesture performed by the user, in accordance with one embodiment of the present disclosure.

FIG. 3B is a flowchart of an embodiment of a method 350 for modifying a scene, e.g., the scene 202A (FIG. 2A), according to a gesture performed by the user 106 (FIG. 1). The method 350 is performed by the processor of the computing device. In an operation 352 of the method 300, a pinch and hold gesture is detected by the processor. A manner in which a pinch and hold gesture is detected is described above with reference to FIG. 3A. In an operation 354 of the method 300, a visual cue is generated indicative of a pinch and hold gesture. Examples of a visual cue and of location in a scene at which a visual cue is generated are provided above.

In an operation 356 of the method 300, a gesture performed by the user 106 is processed while a pinch and hold gesture is active. For example, the processor of the computing device analyzes image data captured using a camera of the camera system whether there is an additional gesture performed by the user 106 within a pre-determined period of time of performing a pinch and hold gesture. To illustrate, the processor of the computing device determines whether a slide gesture, or a rotate gesture is performed by the user 106 while a pinch and hold gesture is being performed by the user 106. To further illustrate, the processor of the computing device determines that a slide gesture is performed when the hand 130A (FIG. 1) slides from one position to another with respect to the xyz co-ordinate system in a substantially linear direction. An example of a substantially linear direction is a direction in which each position of the hand 130A is within a pre-determined variance or a pre-determined standard deviation from one or more initial positions, e.g., positions when the hand 130A starts to slide, etc. Another example of a substantially linear direction is a direction that is substantially parallel to, e.g., within a pre-determined angle from, etc., the x-axis, or the y-axis, or the z-axis, or an axis between the x-axis and y-axis, or an axis between the y-axis and z-axis, or an axis between the x-axis and z-axis. The processor of the computing device identifies the hand 130A from the image data by determining whether characteristics of the hand 130A match pre-stored characteristics of a left hand, e.g., color of a left hand, shape of the left hand, texture of the left hand, position of a thumb of the left hand with respect to remaining fingers of the left hand, etc.

As an illustration of a rotate gesture, the processor of the computing device determines whether the hand 130A substantially rotates with respect to an axis of the xyz co-ordinate system. For example, it is determined from image data of the hand 130A whether positions of the hand 130A are within a pre-determined variance or a pre-determined standard deviation from a circular motion that starts at the location L1. Upon determining that the positions of the hand 130A are within the pre-determined variance or the pre-determined standard deviation from a circular motion that starts at the location L1, the processor of the computing device determines that the hand 130A is substantially rotated to perform a rotate gesture.

In one embodiment, a rotate gesture is performed with respect to the x-axis, or the y-axis, or the z-axis, or an axis between the x-axis and y-axis, or an axis between the y-axis and z-axis, or an axis between the x-axis and z-axis.

In an operation 358 of the method 350, it is determined to modify the scene, referred to in the operation 352, according to the additional gesture. For example, upon determining that a slide gesture is performed by the user 106, the processor of the computing device determines to slide the scene. To illustrate, upon determining that a slide gesture is performed in the z-direction, the processor of the computing device determines to slide the scene in the Z-direction. As another illustration, upon determining that a slide gesture is performed in a direction between the y-axis and the z-axis, the processor of the computing device determines to slide the scene in a direction between the Y-axis and the Z-axis. As yet another illustration, a distance by which a scene slides with respect to the XYZ co-ordinate system is proportional to a distance by which the hand 130A slides with respect to the xyz co-ordinate system.

Figure 4A:
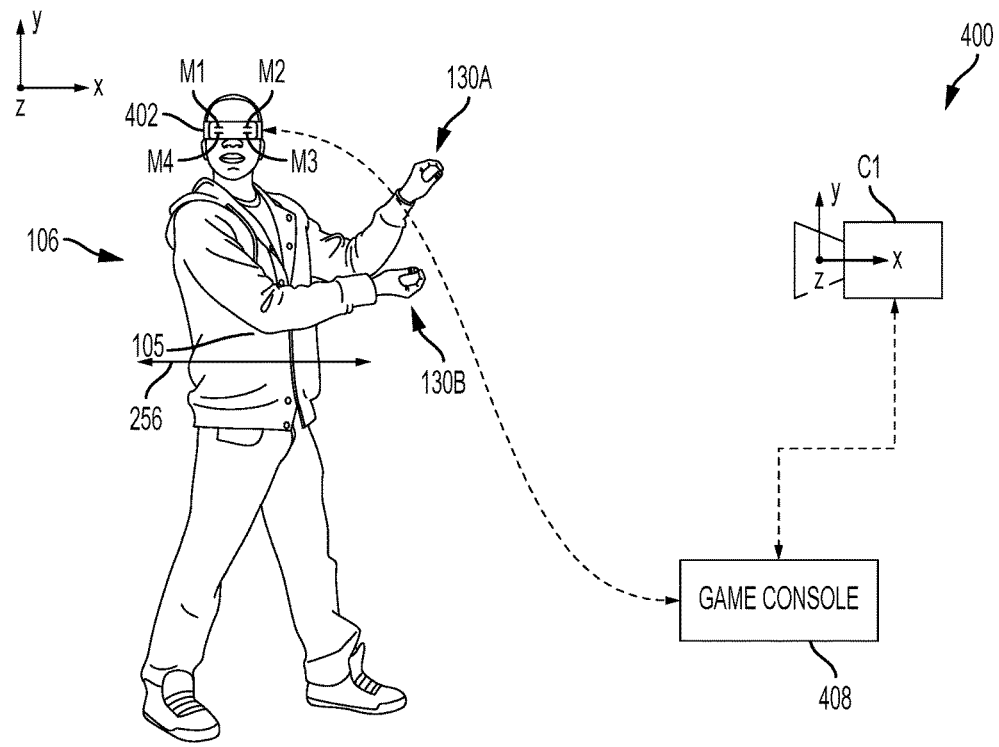
FIG. 4A is a diagram of a system to illustrate capture of positions and orientations of hands of the user using a camera and capture of positions and orientations of the HMD using the camera, in accordance with one embodiment of the present disclosure.

FIG. 4A is a diagram of an embodiment of a system 400 to illustrate capture of positions and orientations of the hands 130A and 130B of the user 106 using a camera C1 and capture of positions and orientations of an HMD 402 using the camera C1. The HMD 402 is an example of the HMD 102 (FIG. 1). Examples of the camera C1 include a digital camera, an infrared camera, a depth camera, etc. An example of a digital camera includes a Playstation Eye™ camera.

The HMD 402 is worn in front of eyes of the user 106 so that one or more display screens of the HMD 402 are located in from of the eyes and cover the eyes. The HMD 402 includes markers M1, M2, M3, and M4, e.g., light emitters, light emitting diodes, retro-reflective tape, infrared light emitters, colored materials, etc., that are located at corners of an outside surface of the HMD 402. The markers M1 thru M4 are oriented to face the camera C1.

The user 106 accesses an interactive environment, e.g., a scene, etc., on the HMD 402. While interacting with the environment, the user 106 makes gestures using his/her hands 130A and 130B. For example, the user 106 makes a pinch and hold gesture, or a slide gesture, or a rotate gesture, or a release gesture, or a double tap gesture, etc.

The camera C1 captures positions of each hand 130A and 130B in each of the x, y, and z-directions. For example, the camera C1 captures distances in x, y, and z directions between a reference point, e.g., origin (0, 0, 0), etc., located at the camera C1 and a finger of the hand 130A. Moreover, the camera C1 captures orientations of each hand 130A and 130B with respect to each of the x-axis, y-axis, and z-axis. For example, the camera C1 captures image data that shows an angle formed between a location of a pinch and hold gesture of the hand 130A and the x-axis or the y-axis or the z-axis. In this example, the x-axis, the y-axis, and the z-axis pass through the reference point of the camera C1.

Moreover, the camera C1 captures positions of the HMD 402 in the x, y and z directions. For example, the camera C1 captures image data that shows that the HMD 402 has moved a distance in the x-direction or in the y-direction or in the z-direction from a reference point, e.g., origin (0, 0, 0), etc., located at the camera C1. As another example, the camera C1 captures image data that shows that the HMD 402 has moved a distance in the z-direction or in the y-direction or in the x-direction from the reference point located at the camera C1. Furthermore, the camera C1 captures orientations of the HMD 102 with respect to each of the x-axis, y-axis and z-axis. For example, the camera C1 captures image data that shows an angle formed between a length of the HMD 102 and the x-axis or the y-axis or the z-axis. An example of the length of the HMD 102 is provided below with reference to FIG. 11. The length of the HMD 102 is greater than a width and is greater than a depth of the HMD 102. In this example, the x-axis, the y-axis, and the z-axis pass through the reference point of the camera C1.

In one embodiment, the camera C1 captures depth using a distance between any two of the markers M1 thru M4. For example, as the user 106 moves closer to the camera C1, a distance between any two of the markers M1 thru M4 as viewed from the camera C1 decreases and as the user moves away from the camera C1, a distance between any two of the markers M1 thru M4 as viewed from the camera C1 increases.

In an embodiment, the HMD 402 includes any other number of markers, e.g., two, three, five, six, etc.

Image data that is captured by the camera C1 is sent using the wired or wireless protocol to a game console 408, which is an example of the computing device. A processor of the game console analyzes the image data to determine whether a gesture, e.g., pinch and hold gesture, slide gesture, rotate gesture, double tap gesture, release gesture, etc., is performed by the user 106. For example, the processor of the game console 408 analyzes image data captured by the camera C1 to determine whether there is a contact between a finger of the hand 130B and a thumb of the hand 130B. The processor of the game console 408 identifies the finger from the image data by using pre-stored parameters regarding the finger, e.g., length of the finger, shape of the finger, color of the finger, texture of the finger, number of finger segments of the finger, position of the finger from the thumb of the hand 130B, etc. Also, the processor identifies the thumb from the image data by using pre-stored parameters regarding the thumb, e.g., length of the thumb, shape of the thumb, color of the thumb, texture of the thumb, number of finger segments of the thumb, position of the thumb from the finger of the hand 130B, etc. Upon identifying the finger and the thumb, the processor determines whether there is contact between the finger and the thumb, e.g., whether image data that represents the finger is within a pre-determined distance of image data that represents the thumb, etc. Upon determining that the image data that represents the finger is within the pre-determined distance from the image data that represents the thumb, the processor determines that there is contact between the finger and the thumb and that a pinch gesture is performed by the hand 130B.

The processor of the game console 408 generates data for rendering a scene according to the gesture and provides the data to the HMD 402 via the wired or wireless protocol. A processor of the HMD 402 applies a rendering program to the data received from the game console 408 to display a scene on one or more display screens of the HMD 402.

In one embodiment, the processor of the game console 408 determines a relative position between the HMD 402 and one or both hands of the user 106. For example, the processor of the game console 408 determines from image data captured using the camera C1 a distance in each of the x, y, and z directions between the HMD 402 and each hand 130A and 130B. Moreover, the processor of the game console 408 determines a relative orientation between the HMD 402 and one or both hands of the user 106. For example, the processor of the game console 408 determines from image data captured using the camera C1 an angle formed between the length of the HMD 402 and an axis that is parallel to a length of the hand 130A and an angle formed between the length of the HMD 402 and an axis that is parallel to a length of the hand 130B. Upon determining that the relative positions of the hands 130A and 130B with respect to the HMD 402 and the relative orientations of the hands 130A and 130B with respect to the HMD 402 indicate that the hands 130A and 130B are within a field-of-view of the HMD 402, the processor of the game console 408 determines to generate data to show the hands 130A and 130B within a scene to be displayed on the HMD 402. On the other hand, upon determining that the relative positions of the hands 130A and 130B with respect to the HMD 402 or the relative orientations of the hands 130A and 130B with respect to the HMD 402 do not indicate that the hands 130A and 130B are within a field-of-view of the HMD 402, the processor of the game console 408 determines to generate data for a scene to be displayed on the HMD 402 without showing the images 108A and 108B of the hands in the scene.

In an embodiment, the field-of-view of the HMD 402 is a field-of-view of a camera when placed on an outside surface of the HMD 402. The camera placed on the outside surface is an externally facing camera that is placed to capture images of the real space in front of the user 106.

In one embodiment, a field-of-view of the HMD 402 extends between top and bottom planes between which a pre-determined angle is formed and between left and right planes between which a pre-determined angle is formed. The top plane extends at a pre-determined angle from a top edge of the HMD 402, the bottom plane extends at a pre-determined angle from a bottom edge of the HMD 402, the left plane extends at a pre-determined angle from a first side edge of the HMD 402, and the right plane extends at a pre-determined angle from a second side edge of the HMD 402. For example, a field-of-view of the HMD 402 is that of a camera having a lens that is located on a front face of the HMD 402.

In one embodiment, the camera C1 is embedded within the game console 408 or within a television or are independently located, e.g., located above the television or the game console or located on a table or on a support, etc.

In an embodiment, positions and orientations of an HMD, described herein, are measured by one or more inertial sensors, e.g., gyroscopes, magnetometers, accelerometers, etc., within the HMD. The measured positions and orientations are communication by a communication device of the HMD to a communication device of the game console 408 for processing by the processor of the game console 408.

Figure 4B:
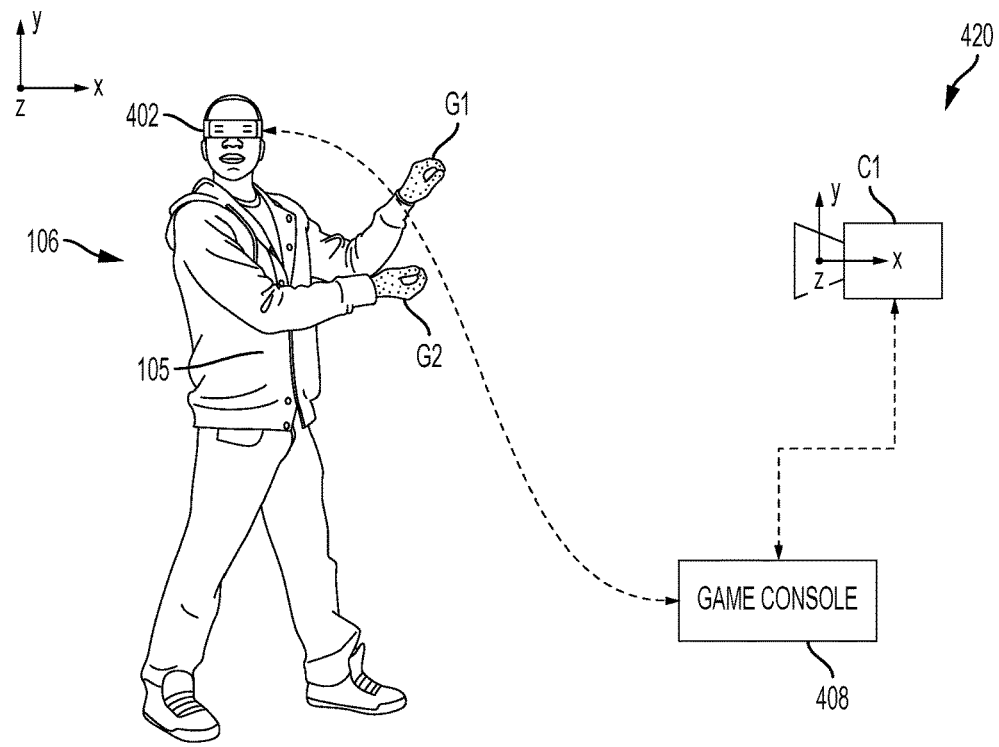
FIG. 4B is a diagram of a system to illustrate use of passive gloves in conjunction with the camera of FIG. 4A to determine positions and orientations of finger segments of the passive gloves, in accordance with one embodiment of the present disclosure.

FIG. 4B is a diagram of an embodiment of a system 420 to illustrate use of gloves G1 and G2 in conjunction with the camera C1 to determine positions and orientations of finger segments of the gloves. The glove G1 is worn on the hand 130A and the glove G2 is worn on the hand 130B by the user 106. The use 106 is also wearing the HMD 102. Each glove G1 and G2 includes five finger segments, one for each finger of a hand on which the glove is worn.

The camera C1 captures image data regarding the HMD 402 as described in a manner with reference to FIG. 4A. Moreover, the camera C1 captures image data of the gloves G1 and G2. The camera C1 captures image data of each segment of each glove G1 and G2 in the same manner described above with respect to FIG. 4A regarding capturing image data of each finger of each hand. For example, the processor of the game console 408 determines from image data captured using the camera C1 positions and orientations of each finger segment of each of the gloves G1 and G2 to determine whether a gesture, e.g., a pinch and hold gesture, a slide gesture, a rotate gesture, a double tap gesture, a release gesture, etc., is performed. To illustrate, a processor identifies a finger segment, e.g., an index finger segment, a thumb finger segment, etc., of the glove G1 by comparing image data regarding the finger segment with pre-stored parameters, e.g. shape, size, position with respect to another finger segment, identification of a hand on which the glove G1 is worn, etc., regarding the finger segment. From one or more gestures performed using the finger segments of one or both of the gloves G1 and G2, the processor modifies data for rendering a scene, as described herein, and provides the modified data to the HMD 402. The HMD 402 displays the scene on one or more display screens of the HMD 402.

In one embodiment, while the pinch and hold gesture is active, e.g., is determined by the processor of the game console 408 as being performed by the user 106, etc., the processor of the game console 408 couples movement of a scene with movement of a glove. For example, when the glove is used to perform a slide gesture, a scene is translated substantially in a direction of movement of the glove. As another example, when the glove is determined to perform a rotate gesture, a scene rotated.

In one embodiment, the gloves G1 and G2 are passive. For example, each glove G1 and G2 includes markers but does not include sensors, which are described below. As another example, each glove G1 and G2 excludes any markers and sensors. The markers on a finger segment help identify positions of the finger segment and an orientation of the finger segment. For example, the processor of the game console 408 identifies from image data received from a camera, image data regarding markers on multiple finger segments and determines whether a marker on a distal phalanx portion of an index finger segment of a glove is in contact with a marker on a distal phalanx portion of a thumb finger segment of the glove. Upon determining that the marker on the distal phalanx portion of the index finger segment is in contact with a marker on the distal phalanx portion of the thumb finger segment, the processor of the game console 408 determines that a pinch gesture is performed by the glove. On the other hand, upon determining that the marker on the distal phalanx portion of the index finger segment is not in contact with a marker on the distal phalanx portion of the thumb finger segment, the processor of the game console 408 determines that the pinch gesture is not performed by the glove. As another example, an orientation of a marker with respect to an axis passing through a length of an arm of the user 106 provides an orientation of a finger segment on which the marker is located.

It should be noted that a communication device of a camera of the camera system and the communication device of the computing device apply the wired or a wireless protocol to communicate data between each other.

It should further be noted that a communication device of the glove and the communication device of the computing device apply the wired or a wireless protocol to communicate data between each other.

In an embodiment, a marker is located on a dorsal side or a ventral side of a glove.

Figure 4C:
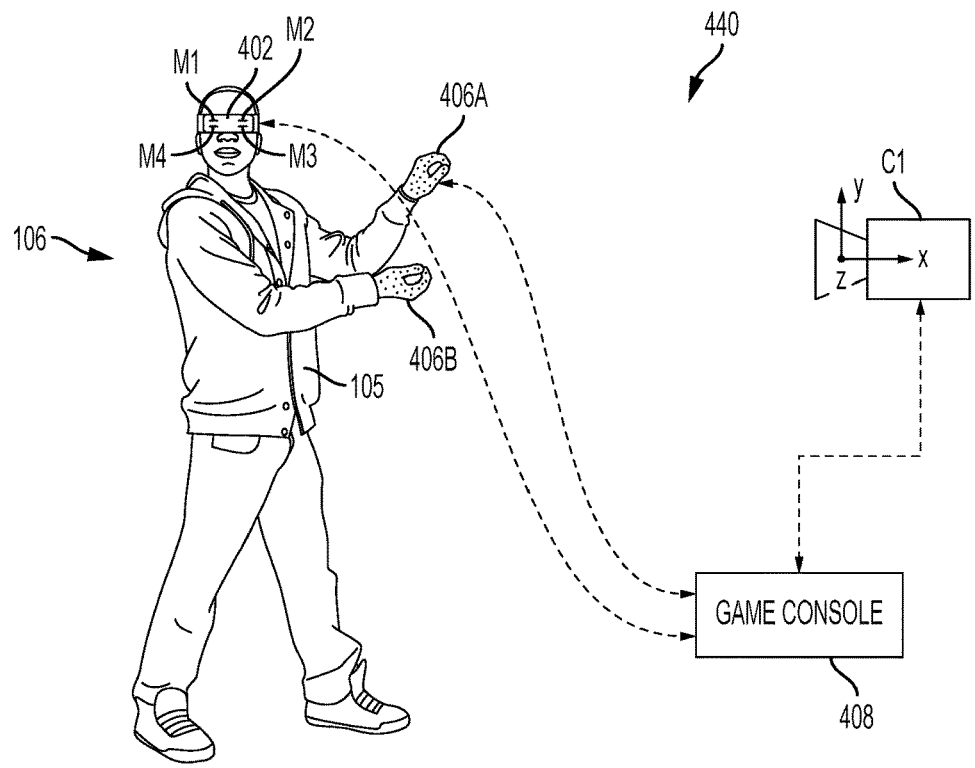
FIG. 4C is a diagram of a system in which active gloves are used to determine positions of finger segments of the active gloves, in accordance with one embodiment of the present disclosure.

FIG. 4C is a diagram of an embodiment of a system 440 in which active gloves 406A and 406B are used to determine positions of finger segments of the gloves. Each glove 406A and 406B includes multiple finger segments, one for each finger of a hand of the user 106. For example, the glove 406A includes five finger segments and the glove 406B includes five finger segments. Each finger segment of each glove 406A and 406B includes electrodes, e.g., conductive pads, resistors, capacitor places, etc.

When there is contact between an electrode of a finger segment of an active glove and an electrode of another finger segment of the active glove, a signal, e.g., a short circuit signal, a signal having a pre-defined voltage, etc., is generated and is sent from the active glove to the game console 408. Upon receiving the signal, an analog-to-digital converter of the game console 408 converts the signal from an analog form into a digital form and upon receiving the digital form of the signal, the processor of the game console 408 determines that a pinch gesture is performed. Moreover, upon receiving the digital form of the signal for greater than a pre-determined amount of time, the processor of the game console 408 determines that a pinch and hold gesture is performed.

Moreover, the camera C1 captures image data of the gloves 406A and 406B, and provides the image data to the processor of the game console 408. The processor of the game console 408 determines positions and orientations of finger segments of the gloves 406A and 406B from the image data to identify a gesture performed. The gesture identified is used by the processor of the gaming console 408 to modify a scene that is to be displayed on the HMD 402.

In one embodiment, image data captured using the camera C1 is used to confirm or deny an occurrence of a pinch and hold gesture determined using the signal obtained from an active glove. For example, the processor of the game console 408 determines whether image data of finger segments of the glove 406A captured using the camera C1 indicates an occurrence of a pinch and hold gesture upon determining that the digital form of the signal obtained using the glove 406A also indicated an occurrence of a pinch and hold gesture. Upon determining that the image data of finger segments of the glove 406A captured using the camera C1 does not indicate an occurrence of a pinch and hold gesture, the processor of the game console 408 determines that the pinch and hold gesture is not performed using the glove 406A and determines not to modify a scene according to the pinch and hold gesture and/or according to a gesture following the pinch and hold gesture. On the other hand, upon determining that the image data of finger segments of the glove 406A captured using the camera C1 indicates an occurrence of a pinch and hold gesture, the processor of the game console 408 determines that the pinch and hold gesture is performed and determines to modify a scene according to the pinch and hold gesture and/or according to a gesture following the pinch and hold gesture.

In an embodiment, the digital form of the signal obtained from an active glove is used to confirm or deny an occurrence of a pinch and hold gesture determined using the camera C1. For example, the processor of the game console 408 determines whether the digital form of the signal obtained using the glove 406A indicates an occurrence of a pinch and hold gesture upon determining that image data of finger segments of the glove 406A captured using the camera C1 indicates an occurrence of a pinch and hold gesture. Upon determining that the digital form of the signal obtained using the glove 406A does not indicate an occurrence of a pinch and hold gesture, the processor of the game console 408 determines that the pinch and hold gesture is not performed using the glove 406A and determines not to modify a scene according to the pinch and hold gesture and/or according to a gesture following the pinch and hold gesture. On the other hand, upon determining that the digital form of the signal obtained using the glove 406A indicates an occurrence of a pinch and hold gesture, the processor of the game console 408 determines that the pinch and hold gesture is performed and determines to modify a scene according to the pinch and hold gesture and/or according to a gesture following the pinch and hold gesture.

In one embodiment, in addition to the camera C1, any number of cameras are used in the systems described using FIGS. 4A thru 4C to capture positions and orientations of the HMD 402 and the hands 130A and 130B of the user 106.

In an embodiment, image data of a hand of the user 106 is captured by the camera C1 and image data of the HMD 402 is captured by the camera C1. The image data of the hand and of the HMD 402 is provided by the camera C1 to the computing device via the wired or the wireless protocol. The processor of the computing device determines a position of the hand with respect to the xyz co-ordinate system and a position of the HMD 402 with respect to the xyz co-ordinate system to further determine that a relative position between the hand and the HMD 402 is such that the hand is within a field-of-view of the HMD 402. Upon determining that the hand is within the field-of-view of the HMD 402, the processor of the computing device generates image data for displaying the hand within a scene and provides the image data to the HMD 402 for display.

In one embodiment, image data regarding a hand of the user 106 provided by the processor of the computing device is a virtual reality image or a cartoon image of the hand or an image of a hand of an avatar. The image data of the hand is rendered to display a virtual hand on one or more display screens of the HMD 402.

Figure 5:
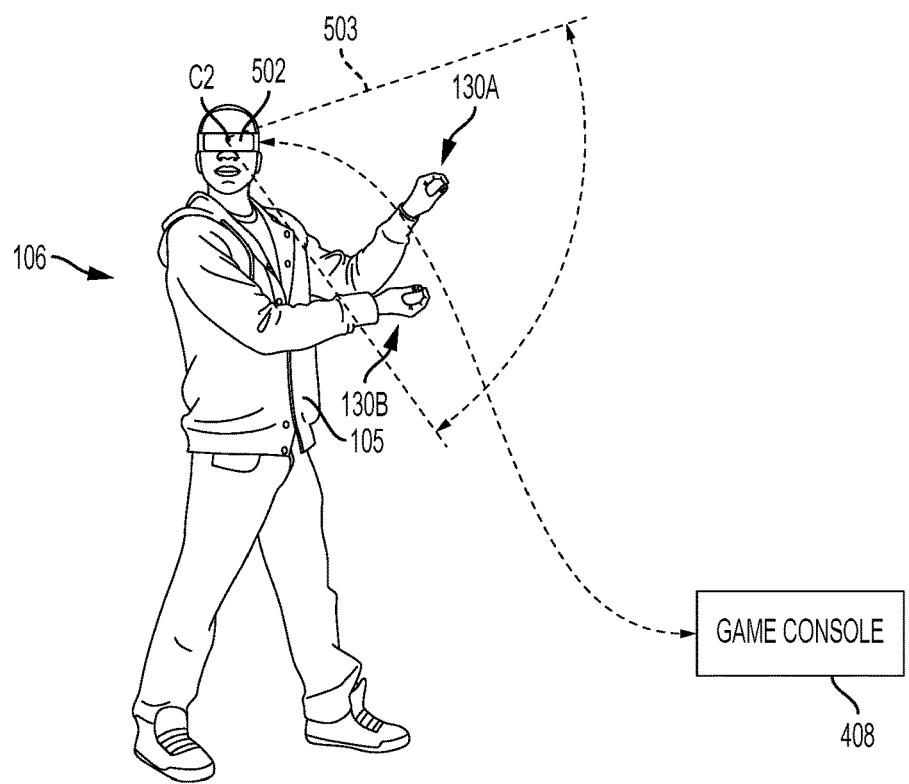
FIG. 5 is a diagram of a system for illustrating use of a camera on an HMD for determining a relative position and relative orientation of hands of the user with respect to the HMD, in accordance with one embodiment of the present disclosure.

FIG. 5 is a diagram of an embodiment of a system 500 for illustrating use of a camera C2 on an HMD 502 for determining a relative position and relative orientation of hands 130A and 130B of the user 106 with respect to the HMD 502. Examples of the camera C2 include a digital camera, a depth camera, an infrared camera, etc. The HMD 502 is an example of the HMD 102 (FIG. 1). The HMD 502 includes a support structure that is supported by a head of the user 106 to facilitate placement of one or more display screens of the HMD 502 in front of eyes of the user 106.

The camera C2 is an externally-facing camera. For example, a lens of the camera C2 has a field-of-view 503 of a portion of a room in front of the user 106. As another example, the camera C2 is embedded within a housing of the HMD 502 and a lens of the camera C2 faces a portion of the real space in front of the user 106.

When the HMD 502 and/or the hands 130A and 130B are positioned and oriented so that the hands are within a field-of-view of the camera C2, the camera C2 captures image data regarding the hands 130A and 130B. The image data is sent from the HMD 502 to the processor of the game console 408. The processor of the game console 408 parses the image data received from the HMD 502 to identify that image data regarding the hands 130A and 130B is included within the received image data. For example, the game console 408 parses the received image data to identify one or more fingers of the hand 130A and one or more fingers of the hand 130B. The identification of a finger of a hand is done by comparing image data regarding the finger with pre-stored image data, e.g., image data regarding a shape of the finger, image data regarding a size of the finger, image data regarding a texture of the finger, image data regarding a color of the finger, image data regarding a position of the finger with respect to one or more of other fingers of the hand, etc. Upon identifying fingers of a hand, the processor of the game console 408 generates image data for displaying the fingers and sends the image data to the HMD 502 for display of images of the fingers in a scene. On the other hand, upon determining that image data regarding a hand of the user 106 is not included in the received image data, the processor of the game console 408 determines not to generate image data of the hand for display on the HMD 502.

Moreover, the processor of the game console 408 analyzes the received image data to identify a gesture that is performed by a hand of the user 106. For example, upon determining that a tip of thumb of a hand of the user 106 is in contact with a tip of another finger of the hand, the processor of the game console 408 determines that a pinch gesture is performed. As another example, upon determining that a position of a pinch and hold gesture changes within the received image data in a substantially linear direction, the processor of the game console 408 determines that a slide gesture is performed. The processor of the game console 408 modifies a scene to be displayed on the HMD 502 according to the gesture that is identified and provides data regarding the scene to the HMD 502 for display.

It should be noted that image data captured by the camera C2 regarding a hand of the user 106 is analyzed by the processor of the gaming console 408 to determine positions and orientations of the hand with respect to the HMD 502. The camera C2 is fixed with respect to the HMD 502 and has the same position and orientation as of the HMD 502.

In an embodiment, the camera C2 is located on an edge of the HMD 502, e.g., is attached to a corner of the HMD 502, etc.

In one embodiment, the user 106 is wearing gloves, e.g., active gloves, passive gloves, etc., and the camera C2 captures image data of finger segments of the gloves and provides the captured image data to the processor of the game console 408. The processor of the game console 408 determines from the image data whether a gesture is performed using the finger segments and whether an image of hands of the user 106 or of gloves worn by the user 106 is to be displayed in a scene. For example, when the image data includes image data regarding a glove worn on a hand of the user 106, the processor of the game console 408 determines that an image of the hand or of the glove is to be displayed in a scene. As another example, when the image data excludes image data regarding a glove worn on a hand of the user 106, the processor of the game console 408 determines that an image of the hand or of the glove is not to be displayed in a scene.

In an embodiment, instead of the HMD 402, the HMD 102 is used in the systems of the FIGS. 4A-4C and instead of the HMD 502, the HMD 102 is used in the system of FIG. 5.

Figure 6:
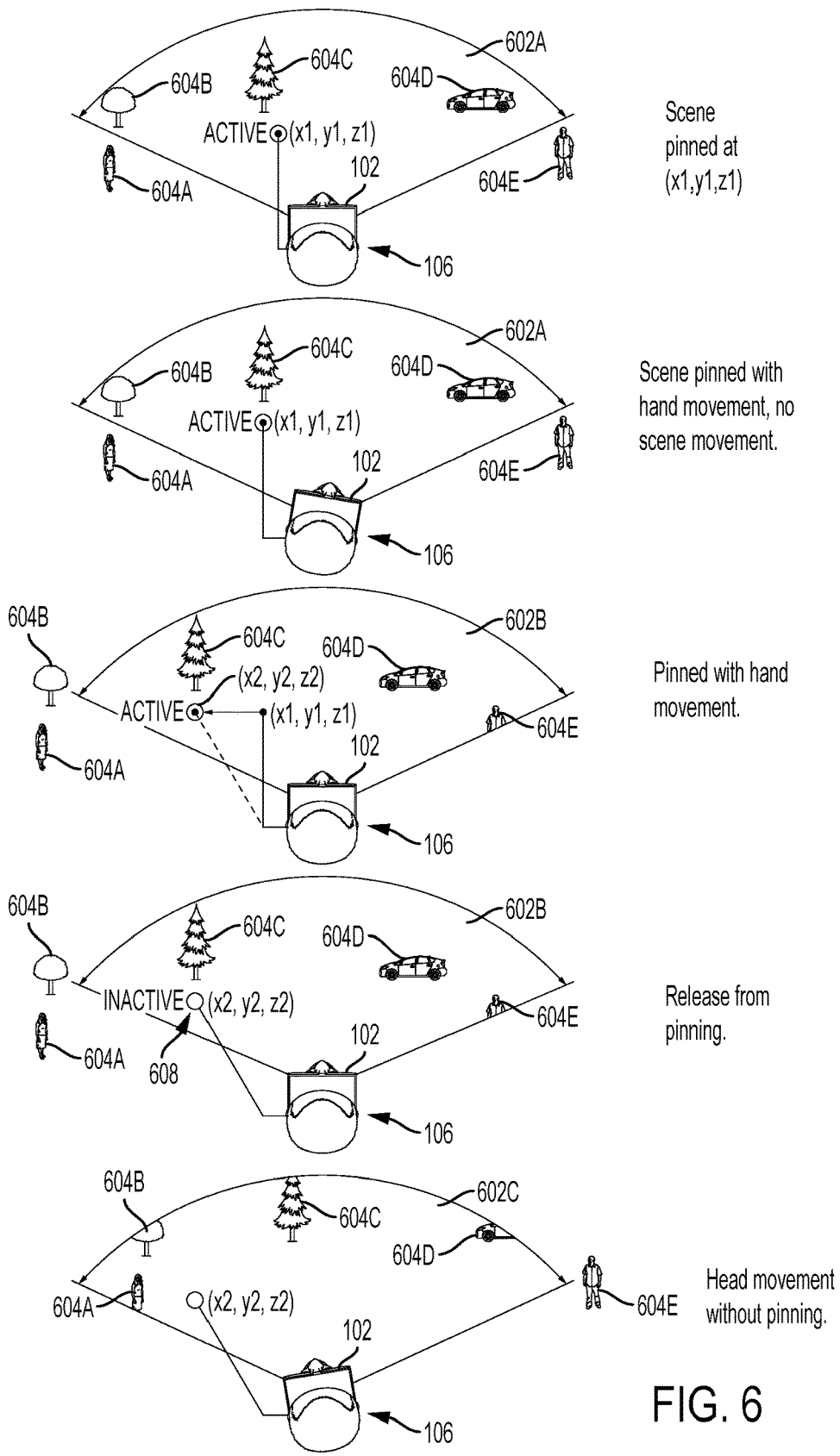
FIG. 6 is a diagram used to illustrate various gestures performed by the user, in accordance with one embodiment of the present disclosure.

FIG. 6 is a diagram used to illustrate various gestures performed by the user 106. The user 106 is viewing a scene 602A on the HMD 102. The user 106 performs a pinch and hold gesture to pin, e.g., fix, establish a relation between the pinch and hold gesture and a point on the scene 602A at which the pinch and hold gesture is performed, etc., the scene 602A at a location (X1, Y1, Z1) with respect to a reference point, e.g., origin (0, 0, 0), etc., within the scene 602A. The scene 602A includes objects 604B, 604C, and 604D that are being displayed to the user 106. Objects 604A and 604E are not being displayed, e.g., rendered, etc., in the scene 602A to the user 106.

When a pinch and hold gesture is active, e.g., is determined as being performed by the user 106, etc., a movement of the HMD 102 does not result in movement of the scene 602A. For example, a camera of the camera system captures image data regarding movement of the HMD 102 while a pinch and gesture is determined to be performed by the user 106. The image data is received by the processor of the game console 408 (FIG. 4A) from the camera of the camera system. Upon receiving the image data indicating the movement of the HMD 102, the processor determines from image data regarding fingers of the hand 130A of the user 106 whether the pinch and hold gesture is active. The image data regarding movement of the HMD 102 is ignored by the processor of the game console 408 and the processor determines not to modify the scene 602A according to the movement of the HMD 102 upon determining from image data regarding the fingers of the hand 130A of the user 106 that the pinch and hold gesture is active.

While the pinch and hold gesture is active, the processor of the game console 408 determines that the hand 130A of the user 106 moves in a substantially linear direction from one location (x1, y1, z1) to another location (x2, y2, z2). Upon determining that the hand 130A moves in the direction from the location (x1, y1, z1) to the location (x2, y2, z2), the processor of the game console 408 determines to move data regarding the scene 602A from the location (X1, Y1, Z1) to a location (X2, Y2, Z2). It should be noted that a distance between X2 and X1 is proportional to a distance between x2 and x1, a distance between Y2 and Y1 is proportional to a distance between y2 and y1, and a distance between Z2 and Z1 is proportional to a distance between z2 and z1. When data regarding the scene is moved, at least a portion of the object 604E is determined to be displayed in a scene 602B by the processor of the game console 408 and the object 604B is determined not to be displayed in the scene 602B. The data regarding the scene 602B is provided to the HMD 102 for display of the scene 602B.

When the scene 602B is being displayed on the HMD 102, the user 106 releases a pinch and hold gesture, e.g., the pinch and hold gesture performed using the left hand 130A, etc. The processor of the game console 408 determines from image data captured using a camera of the camera system that the user 106 is not performing a pinch and hold gesture. For example, the processor analyzes the image data to determine that a thumb of the left hand 130A is not in contact with another finger of the left hand 130A. To illustrate, the processor determines that image pixel data having a color and shape of a thumb of the left hand 130A is not in contact with another image pixel data having a color and shape of another finger of the left hand 130A, the processor determines that the thumb is not in contact with the other finger.

Upon determining that a pinch and hold gesture is not performed by the user 106, the processor of the game console 408 unpins, e.g., detaches, disassociates, inactivates, etc., a coupling between the pinch and hold gesture and the scene 602B. For example, the processor of the game console 408 determines not to move, e.g., translate, rotate, slide, etc., the scene 602B with movement of a hand of the user 106 with which the pinch and hold gesture was being performed. As another example, the scene 602B does not change when the user 106 moves his/her hands after a release gesture is performed until the user 106 makes another pinch and hold gesture.

Moreover, upon determining that the pinch and hold gesture is not performed by the user 106, the processor of the game console 408 determines whether there is movement of the HMD 102 with reference to the xyz co-ordinate system. For example, the processor of the game console 408 analyzes image data captured using a camera of the camera system that the HMD 102 moved when the user 106 rotates his/her head to in a direction to his/her left or to his/her right. Upon determining that the HMD 102 moved, the processor of the game console 408 generates image data to include objects 604A and 604B for display in a scene 602C, and to change positions of the objects 604C and 604D in the scene 602B, and to further remove the object 604E from being displayed in the scene 602C.

In one embodiment, instead of or in addition to using image data captured using a camera of the camera system, the processor of the game console 408 uses the digital form of the signal received from a glove worn on a hand of the user 106 to determine whether a release gesture is performed by the user 106. For example, upon determining that the signal in the digital form is not received from a glove, the processor of the game console 408 determines that sensors of the glove are not in contact with each other and that a pinch and hold gesture is not performed by a hand on which the glove is worn.

It should be noted that although the above-described embodiments are described with reference to the axis 256, in one embodiment, instead of the axis 256, an axis that is parallel to the length of the HMD 102 is used.

Figure 7A:
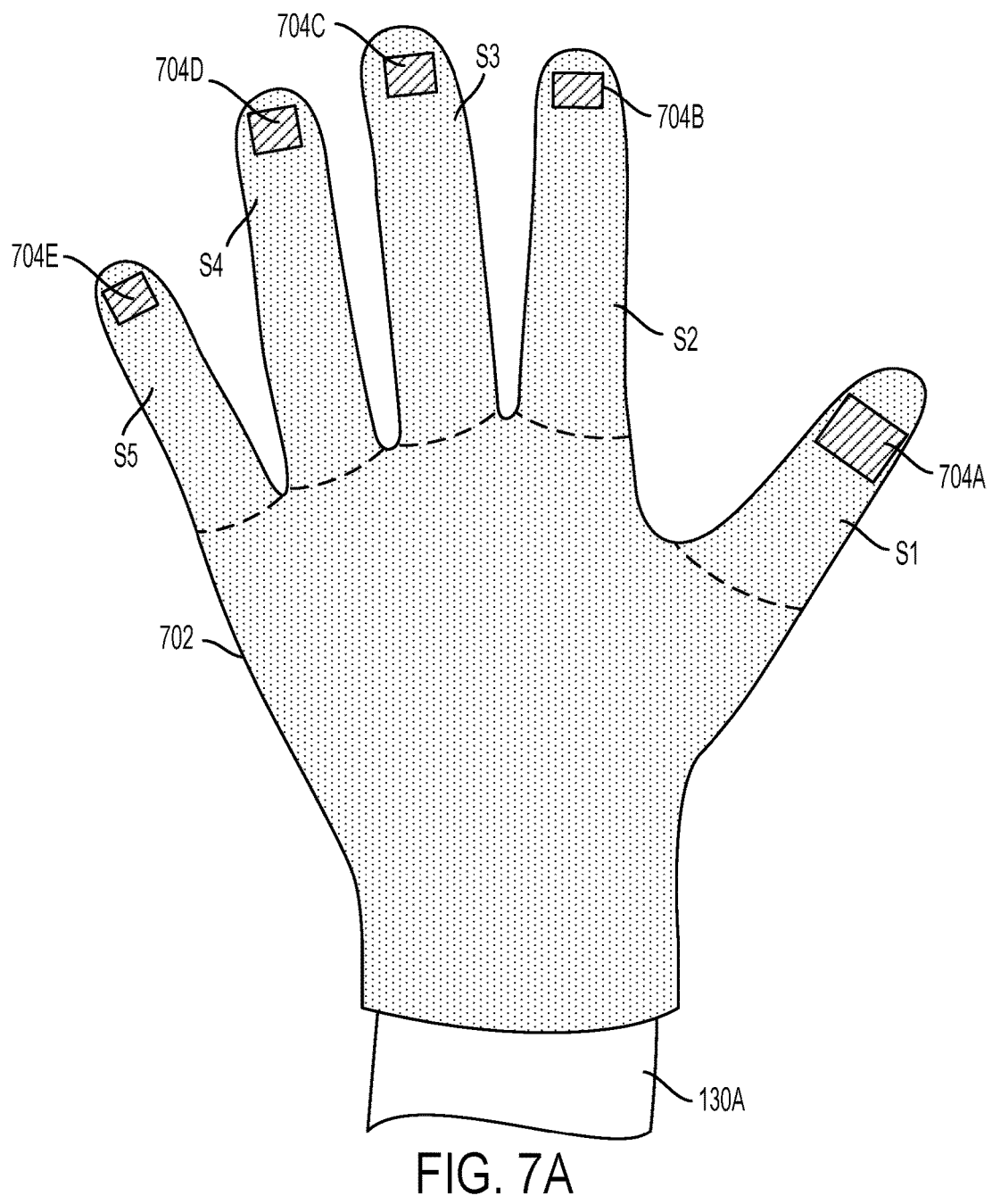
FIG. 7A is a dorsal view of an embodiment of an active glove that is worn by the user on his/her left hand, in accordance with one embodiment of the present disclosure.

FIG. 7A is a dorsal view of an embodiment of an active glove 702 that is worn by the user 106 (FIG. 1) on his/her left hand 130A. The active glove 702 is an example of the glove 406A (FIG. 4C). The active glove 702 includes finger segments S1, S2, S3, S4, and S5. The finger segment S1 covers a thumb of the left hand 130A, the finger segment S2 covers an index finger of the left hand 130A, the finger segment S3 covers a middle finger of the left hand 130A, the finger segment S4 covers a ring finger of the left hand 130A, and the finger segment S5 covers a little finger of the left hand 130A. Each finger segment extends until a dotted line shown in FIG. 7A.

Moreover, each finger segment is equipped with a conductive pad. For example, the finger segment S1 is equipped with a conductive pad 704A, the finger segment S2 is equipped with a conductive pad 704B, the finger segment S3 is equipped with a conductive pad 704C, the finger segment S4 is equipped with a conductive pad 704D, and the finger segment S5 is equipped with a conductive pad 704E. To illustrate, a conductive pad is embedded within a finger segment such that a conductive surface of the conductive pad is located on a dorsal side of the glove 702. It should be noted that each conductive pad is located at or close to a tip of a finger segment. For example, the conductive pad 704A is located on a distal phalanx portion of the finger segment S1, the conductive pad 704B is located on a distal phalanx portion of the finger segment S2, the conductive pad 704C is located on a distal phalanx portion of the finger segment S3, the conductive pad 704D is located on a distal phalanx portion of the finger segment S4, and the conductive pad 704E is located on a distal phalanx portion of the finger segment S5.

The glove 702 is made of a cloth material, or a leather material, or a plastic material, or a combination or two or more thereof. Each conductive pad is made of a conductive material, e.g., a metal, etc., or a semi-conductive material, e.g., a semiconductor, etc.

It should be noted that although the active glove 702 for the left hand 130A is shown, one of ordinary skill in the art would understand that a similar active glove for the right hand 130B (FIG. 1) is fabricated.

Figure 7B:
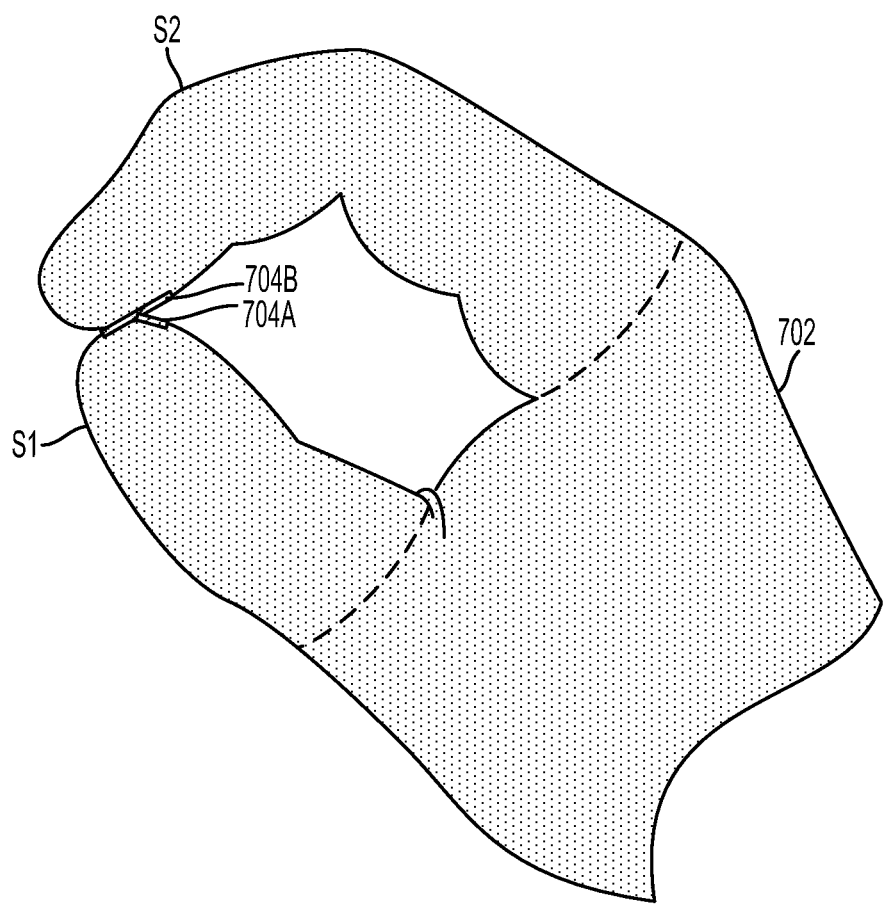
FIG. 7B is a side view of the glove of FIG. 7A to illustrate generation of a signal when a conductive pad of the glove is in contact with another conductive pad of the glove, in accordance with one embodiment of the present disclosure.

FIG. 7B is a side view of an embodiment of the glove 702 to illustrate generation of a signal when a conductive pad of the glove 702 is in contact with another conductive pad of the glove 702. When a pinch and hold gesture is performed by the user 106 (FIG. 1) using the glove 702, the conductive pad 704A comes in contact with the conductive pad 704A. When the conductive pad 704A is in contact with the conductive pad 704B, a short circuit signal is generated and sent via a conductor to a communication device of the glove 702 and the short circuit signal is communicated by the communication device of the glove 701 by using the wired or wireless protocol to the computing device. For example, the conductive pad 704A is connected to a voltage source within the glove 702 and the conductive pad 704B is connected to ground. When the conductive pad 704A contacts the conductive pad 704B, a signal from the voltage source traverses via a path to the ground to generate the short circuit signal. The path connects the voltage source to the ground via the conductive pads 704A and 704B and conductors, e.g., wires, etc. A sensor, e.g., a transistor, a group of transistors, a wire, etc., further described below, is connected to a portion of the path between the conductive pad 704B and ground to sense the short circuit signal. The sensor provides the short circuit signal or another signal generated from the short circuit signal to the communication device of the glove 702 for sending to the computing device. The processor of the computing device receives a digital form of the short circuit signal to determine that a pinch and hold gesture is performed.

It should be noted that different types of active gloves for generating signals when a finger segment of the glove comes in contact with another finger segment of the glove are illustrated in application Ser. No. 14/517,733, filed on Oct. 17, 2014, and titled "Thumb Controller" and in application Ser. No. 14/517,741, filed on Oct. 17, 2014, and titled "Glove Interface Object", both of which are incorporated by reference herein in their entirety.

Moreover, although FIG. 7B describes that contact between a conductive pad of an index finger segment and a conductive pad of a thumb segment of a glove is an example of a pinch gesture, in one embodiment, a contact between the conductive pad 704A and one or more of the conductive pads 704B, 704C, 704D, and 704E occurs to establish a pinch and hold gesture.

Figure 8:
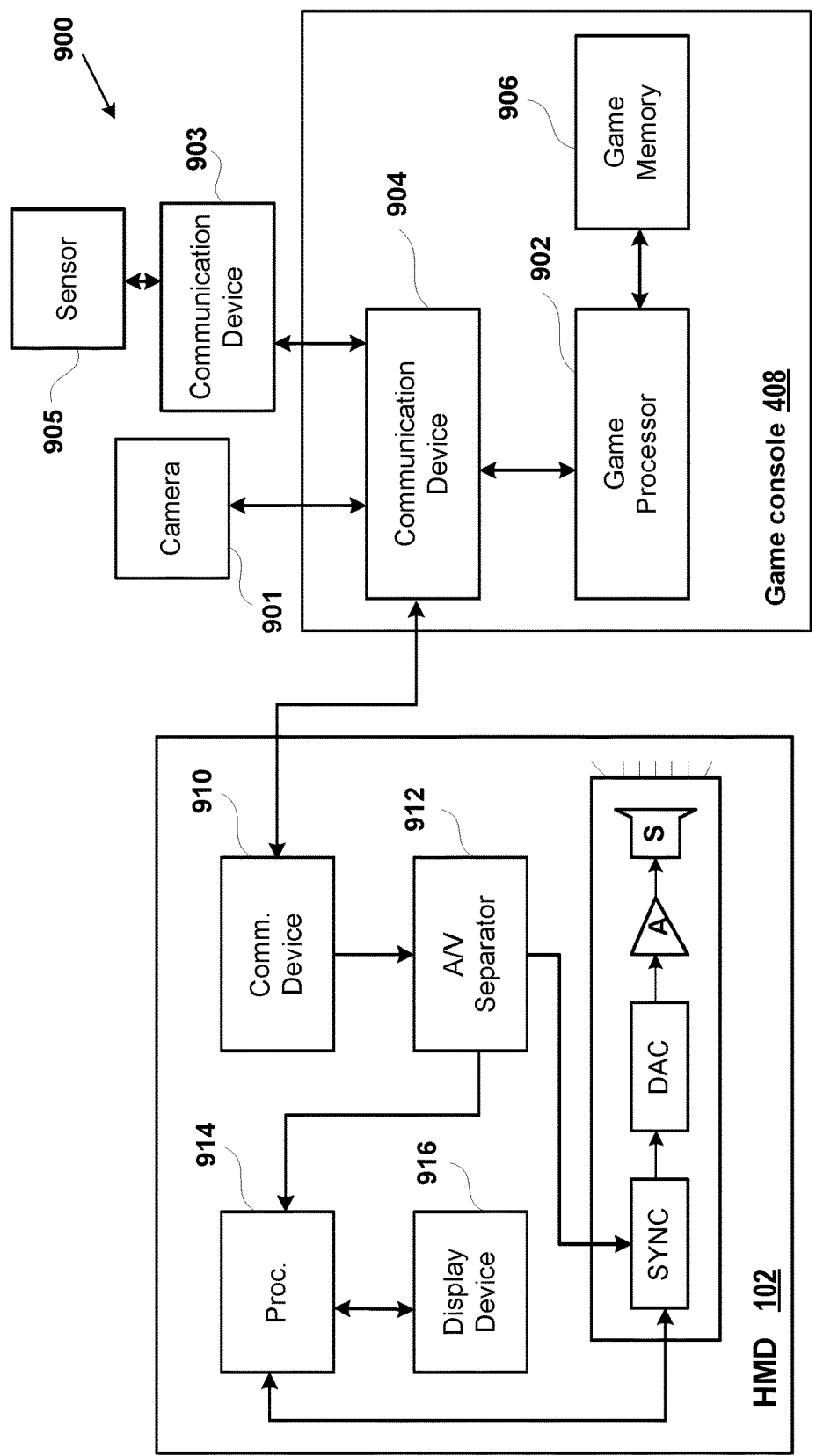
FIG. 8 is a diagram of an embodiment of a system to illustrate a communication of data between various devices of the system to display a scene on the HMD, in accordance with one embodiment of the present disclosure.

FIG. 8 is a diagram of an embodiment of a system 900 to illustrate a communication of data between various devices of the system 900 to display a scene on the HMD 102. A camera system 901, which includes one or more cameras, captures image data, e.g., image data of fingers of a hand of the user 106, image data of the HMD 102, etc., and applies the wired or wireless protocol to the image data to generate a communication signal. The camera system 901 sends the communication signal to a communication device 904 of the game console 408. Examples of one or more cameras of the camera system 901 include the camera C1 (FIG. 4A), the camera C2 (FIG. 5), etc.

A sensor 905 senses a signal, e.g., the short circuit signal, etc., when a conductive pad comes in contact with another conductive pad. Examples of the sensor 905 are provided above. The sensor 905 provides the short circuit signal or another signal that is generated when the short circuit signal is received by the sensor 905 to a communication device 903 coupled to the sensor 905. The communication device 903 applies the wireless or wired protocol to the short circuit signal or to the other signal generated by the sensor 905 to generate a communication signal and sends the communication signal to the communication device 904.

The communication device 904 of the game console 408 receives the communication signal from the camera system 901 and the communication signal from the communication device 903. The communication device 904 applies the wired or wireless protocol to the communication signal received from the camera system 901 to retrieve the image data from the communication signal. Moreover, the communication device 904 applies the wired or wireless protocol to the communication signal received from the communication device 903 to retrieve the short circuit signal or the other signal generated by the sensor 905. An analog-todigital converter (not shown) located between the communication device 904 and a game processor 902 converts the short circuit signal or the other signal generated by the sensor 905 from the analog form to the digital form to generate a digital signal, e.g., the digital form of the short circuit signal, etc.

The game processor 902 receives the digital signal and the image data, and analyzes the digital signal and the image data to determine a gesture, e.g., a pinch and hold gesture, a slide gesture, a rotate gesture, etc., performed by the user 106. The game processor 902 identifies from an interactive program code, e.g., a game computer program code for playing a game, a computer program code for generating data regarding an augmented reality environment, a computer program code for generating data regarding a virtual reality environment, a computer program code for generating data regarding a real-time video, etc., stored within game memory device 906, a state of a scene to be displayed on the HMD 102 corresponding to the gesture. The state is defined by various parameters, e.g., location of objects in a scene, functions of the objects, colors of the objects, textures of the objects, shapes of the objects, audio outputs of the objects, smell provided by the objects, taste provided by the objects, feel provided by the objects, etc. Data regarding the state is provided by the game processor 902 to the communication device 904. The communication device 904 applies the wired or the wireless protocol to generate a communication signal and sends the communication signal to a communication device 910 of the HMD 102.

The communication device 910 applies the wireless or wired protocol to retrieve data regarding the state from the communication signal and provides the data regarding the state to an audio/video (A/V) separator 912. The A/V separator 912 separates audio data in the data regarding the state from image data in the data regarding the state received from the communication device 910. The image data is sent by the A/V separator 912 to a processor 914 for rendering the image data to display a scene, e.g., an image of an object, image of a background, etc., on a display device 916. Examples of a display device include a LCD display device, an LED display device, a plasma display device, etc.

The audio data is sent to a synchronizer for synchronizing a display of the image data with output of the audio data via one or more speakers of the HMD 102. The synchronizer schedules for playing sound associated with display of an object in a scene at the same time the object is displayed. The synchronizer sends the audio data to a digital-to-analog converter (DAC) that converts the audio data from a digital format into an analog format. The analog audio data is amplified by an amplifier (A) of the HMD 102. The amplified analog audio data is converted into sound by the one or more speakers of the HMD 102.

In one embodiment, an object, as described herein, includes a background of a scene.

Examples of a memory device include a random access memory (RAM), a read-only memory (ROM), a volatile memory, a non-volatile memory, a redundant array of disks, a Flash memory, etc.

In one embodiment, either the camera system 901 or the communication device 903 is connected to the game console 408.

In an embodiment, the communication device 903 is programmed to identify whether a signal generated by the sensor 905 is associated with a glove worn on the right hand 130B or the left hand 130A. For example, the communication device 903 embeds within a communication signal to be sent to the communication device 904 that the sensor 905 is located within a glove worn on the right hand 130B. The game processor 902 receives the identification to identify that a signal generated by the sensor 905 or the short circuit signal transferred by the sensor 905 is generated by the sensor 905 of the glove worn on the left or the right hand of the user 106.

In one embodiment, the communication device 903 is connected to a port of the game console 408 and the port is associated with a glove worn on the right hand of the user 106. Moreover, another communication device of a glove worn on the left hand of the user 106 is connected to another port of the game console 408. The separate ports facilitate identification by the game processor 408 that a signal generated by the sensor 905 or the short circuit signal transferred by the sensor 905 is received from the glove worn on the right hand and a signal generated by a sensor of the glove worn on the left hand or a short circuit signal transferred by the sensor of the glove worn on the left hand is received from the glove worn on the left hand of the user 106.

It should be noted that although the above embodiments describe contact of a thumb of a hand of the user 106 with one or more fingers of the hand, in one embodiment, when contact is established between two or more fingers of the hand, a pinch gesture is determined by the processor of the computing device to be performed.

Figure 9:
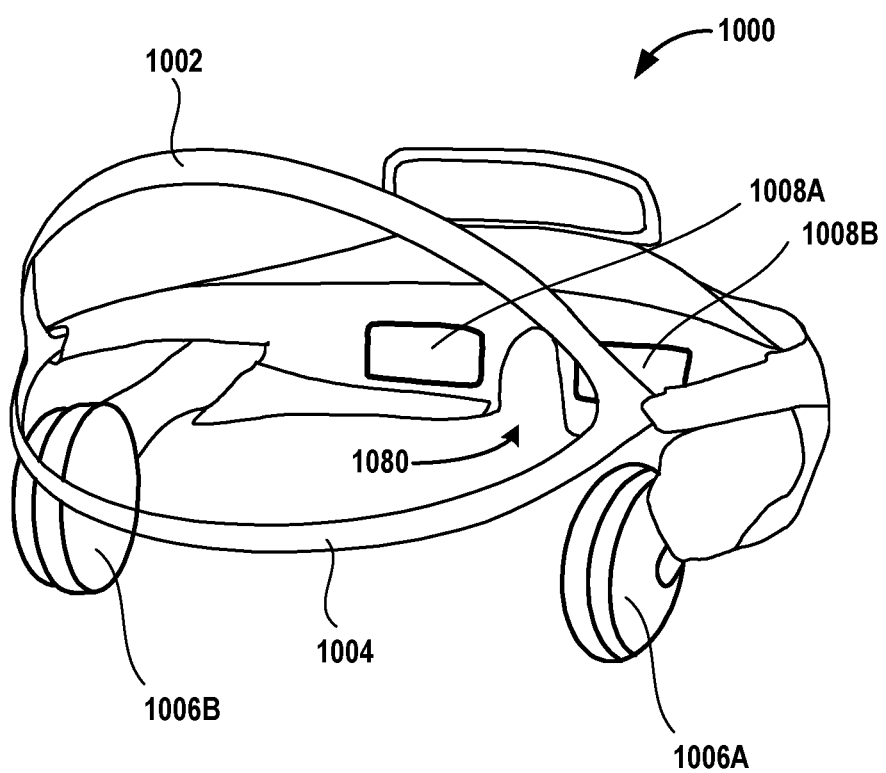
FIG. 9 is an isometric view of an HMD, in accordance with one embodiment of the present disclosure.

FIG. 9 is an isometric view of an HMD 1000, which is an example of the HMD 102. The HMD 1000 includes bands 1002 and 1004 that go to the back of the head of the user 106 when worn by the user 106 (FIG. 1). Moreover, the HMD 1000 includes earphones 1006A and 1006B, e.g., speakers, etc., that emanate sound associated with an interactive environment, e.g., a game environment, a scene, an object in a scene, an interactive tour environment, etc., that is presented by execution of the interactive program code, e.g., a game program, an interactive environment generation program, etc. The HMD 1000 includes lenses 1008A and 1008B that allow the user 106 to view an interactive environment that is displayed on a display screen of the HMD 1000. A groove 1080 rests on a nose of the user 106 to support the HMD 1000 on the nose.

In some embodiments, the HMD 1000 is worn by the user 106 in a manner similar to which sunglasses, glasses, or reading glasses are worn by the user 106.

Figure 10:
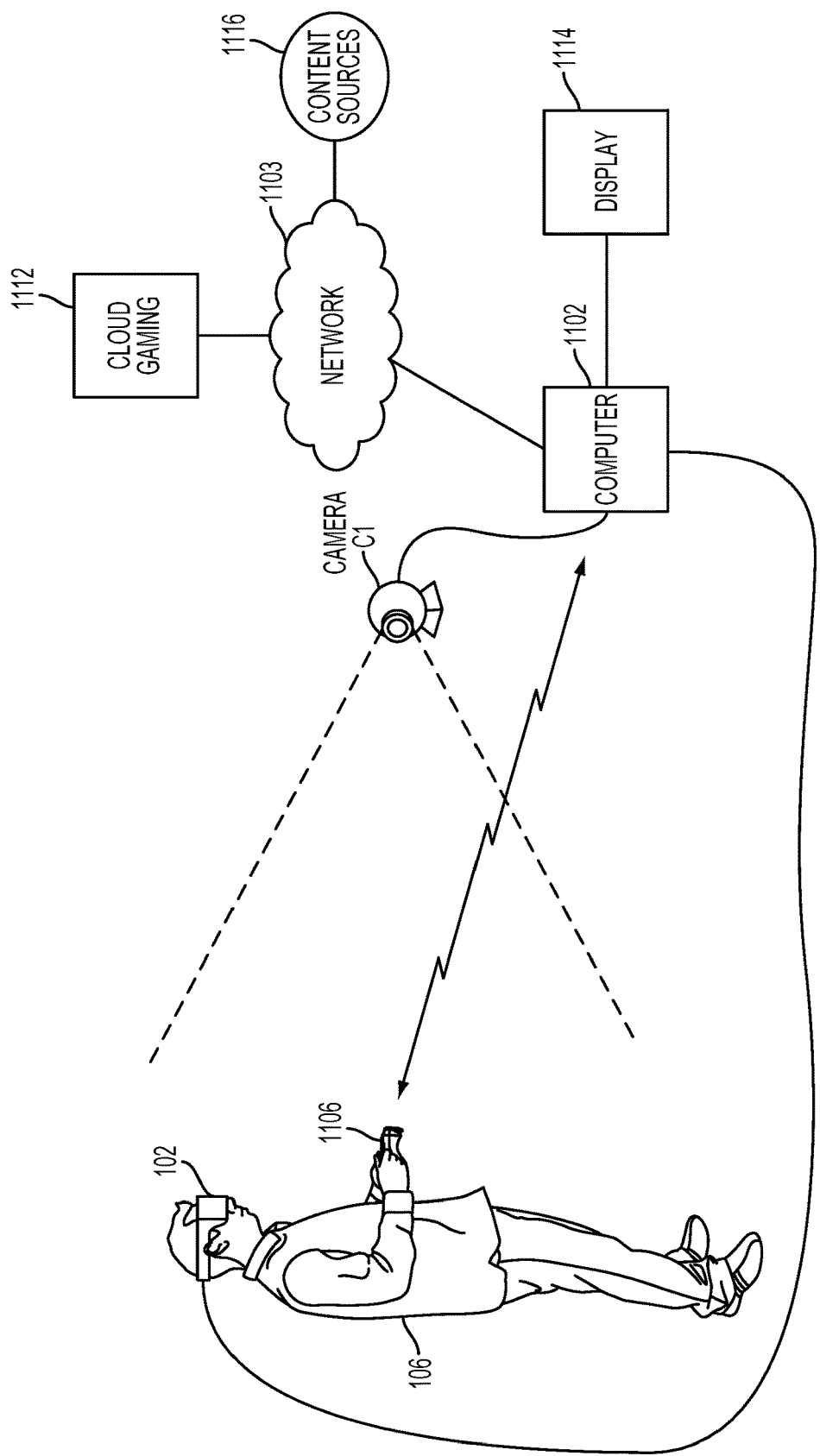
FIG. 10 illustrates a system for interactive game play of a video game, in accordance with one embodiment of the present disclosure.

FIG. 10 illustrates a system for interactive game play of a video game, in accordance with an embodiment described in the present disclosure. The user 106 is shown wearing the HMD 102. The HMD 102 is worn in a manner similar to glasses, goggles, or a helmet, and is configured to display a video game or other content to the user 106. The HMD 102 provides an immersive experience to the user 106 by virtue of its provision of display mechanisms (e.g., optics and display screens) in close proximity to the user's eyes and the format of content that is delivered to the HMD 102. In one example, the HMD 102 provides display regions to each of the user's eyes which occupy large portions or even the entirety of the field of view of the user 106. As another example, the user 106 feels as if he/she is in, e.g., is a part of, etc., an interactive environment that is displayed on the HMD 102.

In one embodiment, the HMD 102 is connected to a computer 1102, which is an example of the computing device. The connection to computer 1102 is wired or wireless. The computer 1102, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 102 connects directly to the Internet, which may allow for cloud gaming without the need for a separate local computer. In one embodiment, the computer 1102 executes a video game (and other digital content), and output the video and audio from the video game for rendering by the HMD 102.

The computer 1102, in one embodiment, is a local or remote computer, and the computer runs emulation software. In a cloud gaming embodiment, the computer 1102 is remote and is represented by a plurality of computing services that are implemented in data centers, where game systems/logic is employed and distributed to the user 106 over a computer network.

The user 106 operates a hand-held controller 1106 to provide input for an interactive environment. In one example, the camera C1 captures images of a real-world environment in which the user 106 is located. These captured images are analyzed to determine a location and movements of the user 106, the HMD 102, and the controller 1106. In one embodiment, the controller 1106 includes a light, or lights, which are tracked to determine its location and orientation. Additionally, as described in further detail below, in one embodiment, the HMD 102 includes one or more lights, which are tracked as markers to determine the location and orientation of the HMD 102 in substantial real-time during a display of an interactive environment.

The camera C1, in one embodiment, includes one or more microphones to capture sound from the real-world space. Sound captured by a microphone array is processed to identify the location of a sound source. Sound from an identified location is selectively utilized or processed to exclusion of other sounds not from the identified location. Furthermore, in one embodiment, the camera C1 included multiple image capture devices, e.g., stereoscopic pair of cameras, an infrared (IR) camera, a depth camera, and combinations thereof.

In some embodiments, the computer 1102 executes games locally on the processing hardware of the computer 1102. The games or content is obtained in any form, such as physical media form (e.g., digital discs, tapes, cards, thumb drives, solid state chips or cards, etc.) or by way of download from a computer network 1103. In an embodiment, the computer 1102 functions as a client in communication over the computer network 1103 with a cloud gaming provider 1112. The cloud gaming provider 1112 maintains and executes the video game being played by the user 106. The computer 1102 transmits inputs from the HMD 102, the controller 1106, and/or the camera C1, to the cloud gaming provider 1112, which processes the inputs to affect the game state of the video game being executed. The output from the executing video game, such as video data, audio data, and haptic feedback data, is transmitted to the computer 1102. The computer 1102 further processes the data before transmission or directly transmits the data to the relevant devices. For example, video and audio streams are provided to the HMD 102, whereas a vibration feedback command is provided to the controller 1106.

In one embodiment, the HMD 102, controller 1106, and camera C1, are networked devices that connect to the computer network 1103 to communicate with the cloud gaming provider 1112. For example, the computer 1102 may be a local network device, such as a router, that does not otherwise perform video game processing, but facilitates passage of network traffic. The connections to the computer network 1103 by the HMD 102, controller 1106, and camera C1 are wired or wireless. In some embodiments, content executed on the HMD 102 or displayable on a display device 1114, e.g., a television, an LCD display device, an LED display device, a plasma display device, a computer monitor, etc., is obtained from any of content sources 1116. Example content sources include, for instance, internet websites that provide downloadable content and/or streaming content. In some examples, the content includes any type of multimedia content, such as movies, games, static/dynamic content, pictures, social media content, social media websites, interactive tour content, cartoon content, etc.

In one embodiment, the user 106 is playing a game on the HMD 102, where such content is immersive three-dimensional interactive content. The content on the HMD 102, while the user 106 is playing, is shared to the display device 1114. In one embodiment, the content shared to the display device 1114 allows other users proximate to the user 106 or remote to watch along with game play of the user 106. In still further embodiments, another player viewing the game play of user 106 on the display device 1114 participates interactively with user 106. For example, a user viewing the game play on the display device 1114 controls characters in the game scene, provides feedback, provides social interaction, and/or provides comments (via text, via voice, via actions, via gestures, etc.,) which enables the user who is not wearing the HMD 102 to socially interact with the user 106.

Figure 11:
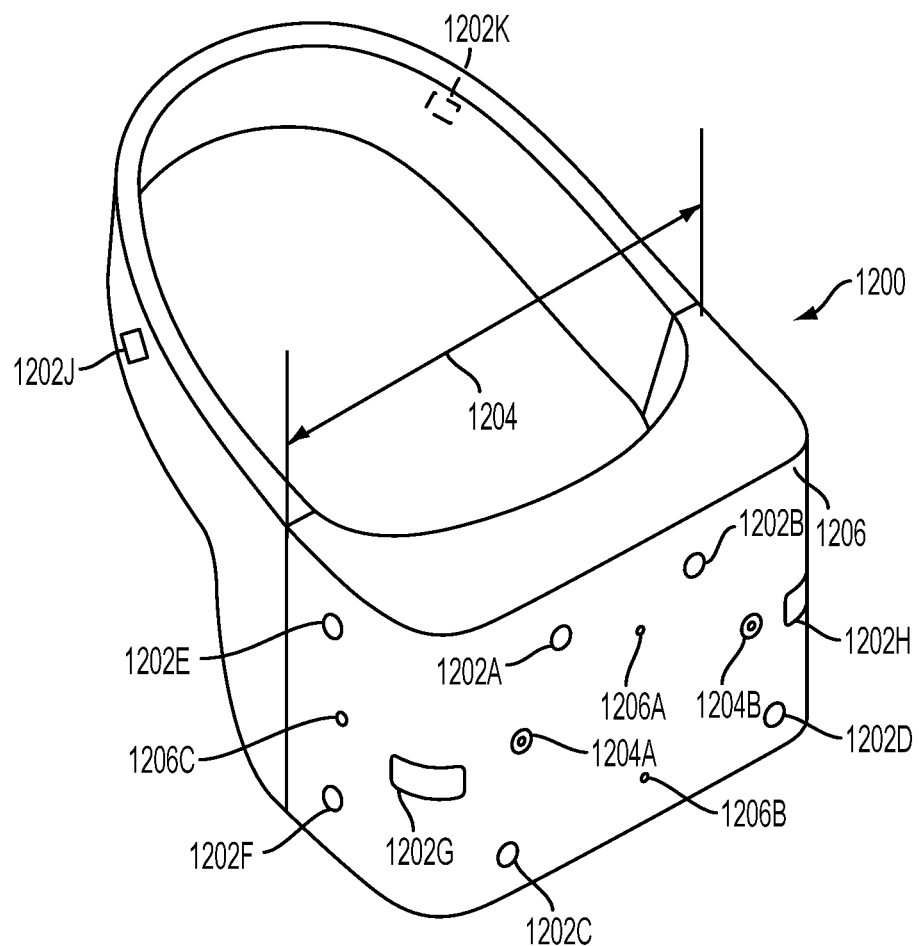
FIG. 11 is an isometric view of an HMD, in accordance with an embodiment described in the present disclosure.

FIG. 11 illustrates a head-mounted display (HMD) 1200, in accordance with an embodiment described in the present disclosure. The HMD 1200 is an example of the HMD 102 (FIG. 1) and has a length 1204 that extends from one end of a front face 1206 of the HMD 102 to an opposite end of the front face 1206 of the HMD 102. As shown, the HMD 1200 includes a plurality of lights 1202A-H, J and K (e.g., where 1202K and 1202J are located toward the rear or backside of the HMD headband). Each of these lights has specific shapes and/or positions, and is has the same or different colors. The lights 1202A, 1202B, 1202C, and 1202D are arranged on a front surface of the HMD 1200. The lights 1202E and 1202F are arranged on a side surface of the HMD 1200. And the lights 1202G and 1202H are arranged at corners of the HMD 1200, so as to span the front surface and a side surface of the HMD 1200. It will be appreciated that the lights are identified in captured images of an interactive environment in which a user uses the HMD 1200.

Based on identification and tracking of the lights, the location and orientation of the HMD 1200 in the interactive environment is determined. It will further be appreciated that some of the lights are or are not visible depending upon the particular orientation of the HMD 1200 relative to an image capture device, e.g., a camera, a digital camera, a depth camera, an infrared camera, etc. Also, different portions of lights (e.g. lights 1202G and 1202H) are exposed for image capture depending upon the orientation of the HMD 1200 relative to the image capture device. In some embodiments, inertial sensors are disposed in the HMD 1200, which provide feedback regarding positioning, without the need for lights. In some embodiments, the lights and inertial sensors work together, to enable mixing and selection of position/motion data.

In one embodiment, the lights are configured to indicate a current status of the HMD 1200 to others users in the real space. For example, some or all of the lights have a color arrangement, an intensity arrangement, blink, have an on/off configuration, or other arrangement indicating a current status of the HMD 1200. By way of example, the lights display different configurations during active game play of a video game (generally game play occurring during an active timeline or within a scene of the game) versus other non-active game play aspects of a video game, such as navigating menu interfaces or configuring game settings (during which the game timeline or scene is inactive or paused).

In an embodiment, the lights indicate relative intensity levels of game play. For example, the intensity of lights, or a rate of blinking, increases when the intensity of game play increases.

The HMD 1200, in one embodiment, additionally includes one or more microphones. In the illustrated embodiment, the HMD 1200 includes microphones 1204A and 1204B located on the front surface of the HMD 1200, and a microphone located on a side surface of the HMD 1200. By utilizing an array of microphones, sound from each of the microphones is processed to determine a location of the sound's source. This information is utilized in various ways, including exclusion of unwanted sound sources, association of a sound source with a visual identification, etc.

The HMD 1200 includes one or more image capture devices. In the illustrated embodiment, the HMD 1200 is shown to include image capture devices 1206A and 1206B. In an embodiment, by utilizing a stereoscopic pair of image capture devices, 3D images and video of a real-world environment in front of the HMD 1200 is captured from the perspective of the HMD 1200. Such video is presented to the user 106 to provide the user with a "video see-through" ability while wearing the HMD 1200. That is, though the user 106 cannot see through the HMD 1200 in a strict sense, the video captured by the image capture devices 1206A and 1206B nonetheless provides a functional equivalent of being able to see the real-world environment external to the HMD 1200 as if looking through the HMD 1200.

Such video, in one embodiment, is augmented with interactive elements to provide an augmented reality experience, or is combined or blended with interactive elements in other ways. Though in the illustrated embodiment, two cameras are shown on the front surface of the HMD 1200, it will be appreciated that there may be any number of externally facing cameras or a single camera is installed on the HMD 1200, and oriented in any direction. For example, in another embodiment, there may be cameras mounted on the sides of the HMD 1200 to provide additional panoramic image capture of the environment.

Figure 12:
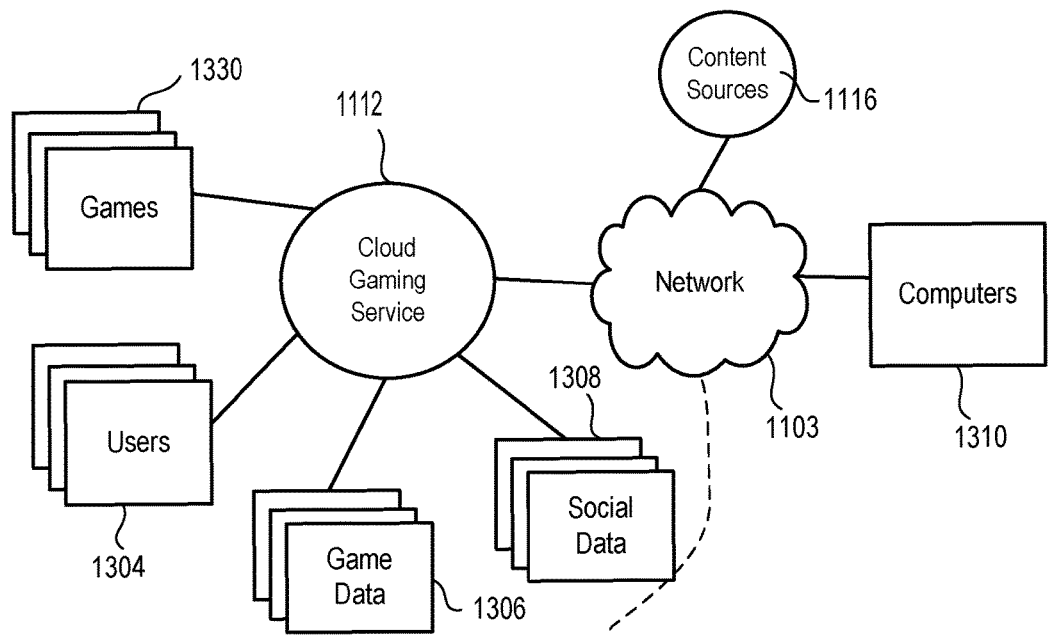
FIG. 12 illustrates one example of game play using a client system that is capable of rendering video game content to an HMD worn by a user, in accordance with one embodiment of the present disclosure.
Figure 12:
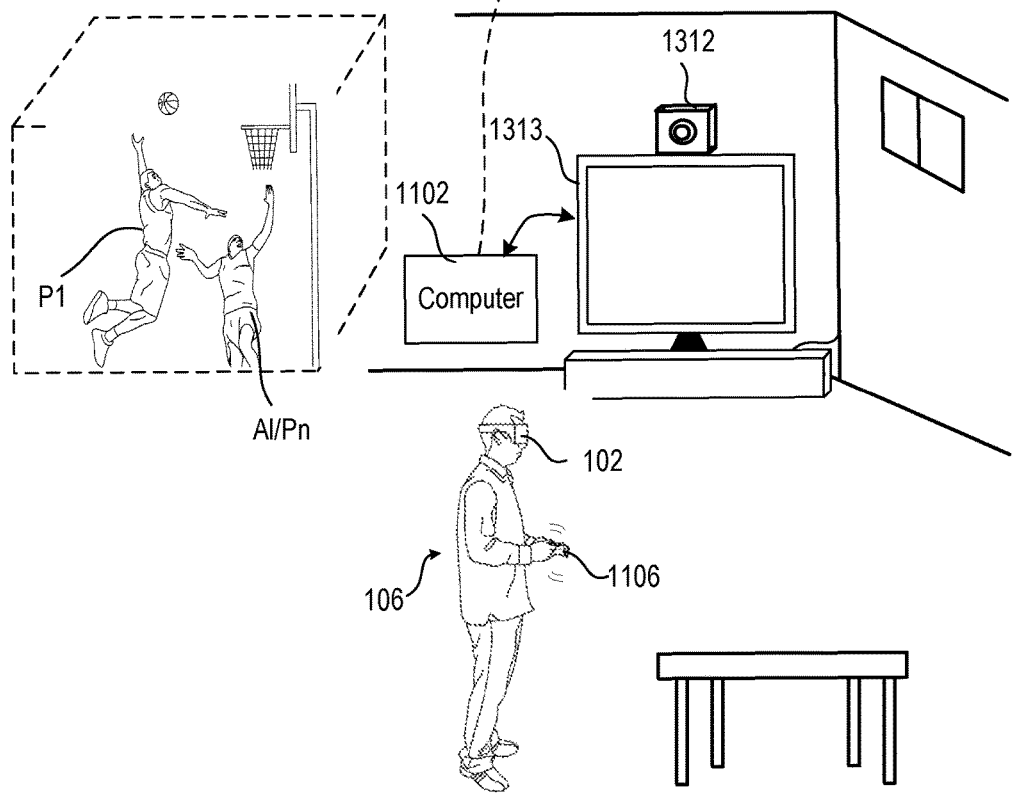

FIG. 12 illustrates one example of game play using the computer 1102 (FIG. 10) that is capable of generating and providing video game content to the HMD 102 (FIG. 1) of the user 106 for rendering on the HMD 102. In this illustration, a state of an object, e.g., game content, etc., provided to the HMD 102 is in a rich interactive 3-D space. As discussed above, a state of an interactive object is downloaded to the computer 1102 or is executed in one embodiment by a cloud processing system. The cloud gaming service 1112 includes a database of users 1304, which are allowed to access particular games 1330, share experiences with other friends, post comments, and manage their account information.

The cloud gaming service 1112 stores game data 1306 for specific users, which and the game data is usable during game play, for future game play, for sharing to a social media network, or used for storing trophies, awards, status, ranking, etc. Social data 1308 is managed by the cloud gaming service 1112. In one embodiment, the social data 1308 is managed by a separate social media network, which is interfaced with the cloud gaming service 1112 over the computer network 1103. Over the computer network 1103, any number of computers 1310, including the computer 1102, is connected for access to the content and interaction with other users.

Continuing with the example of FIG. 12, the three-dimensional interactive scene viewed in the HMD 102 includes game play, such as the characters illustrated in a 3-D view, or another interactive environment. One character, e.g. P1, etc., is controlled by the user 106 that is wearing the HMD 102. This example shows a basketball scene between two players, where the HMD user 106 is dunking a ball on another character in the 3-D view. The other character is an AI (artificial intelligence) character of the game, or is controlled by another player or players (Pn). The user 106, who is wearing the HMD 102, is shown moving about in a space of use, where the HMD 102 moves around based on the user's head movements and body positions. A camera 1312 is shown positioned over a display screen in the room, however, for HMD use, in one embodiment, the camera 1312 is placed in any location that captures images of the HMD 102. The camera 1312 is an example of the camera C1 (FIG. 4A). As such, the user 106 is shown turned at about 90 degrees from the camera 1312 and a display device 1313, as content rendered in the HMD 102 is dependent on the direction that the HMD 102 is positioned, from the perspective of the camera 1312. Of course, during HMD use, the user 106 is moving about, turning his head, looking in various directions, as is needed to take advantage of the dynamic interactive scenes rendered by the HMD 102.

Figure 13:
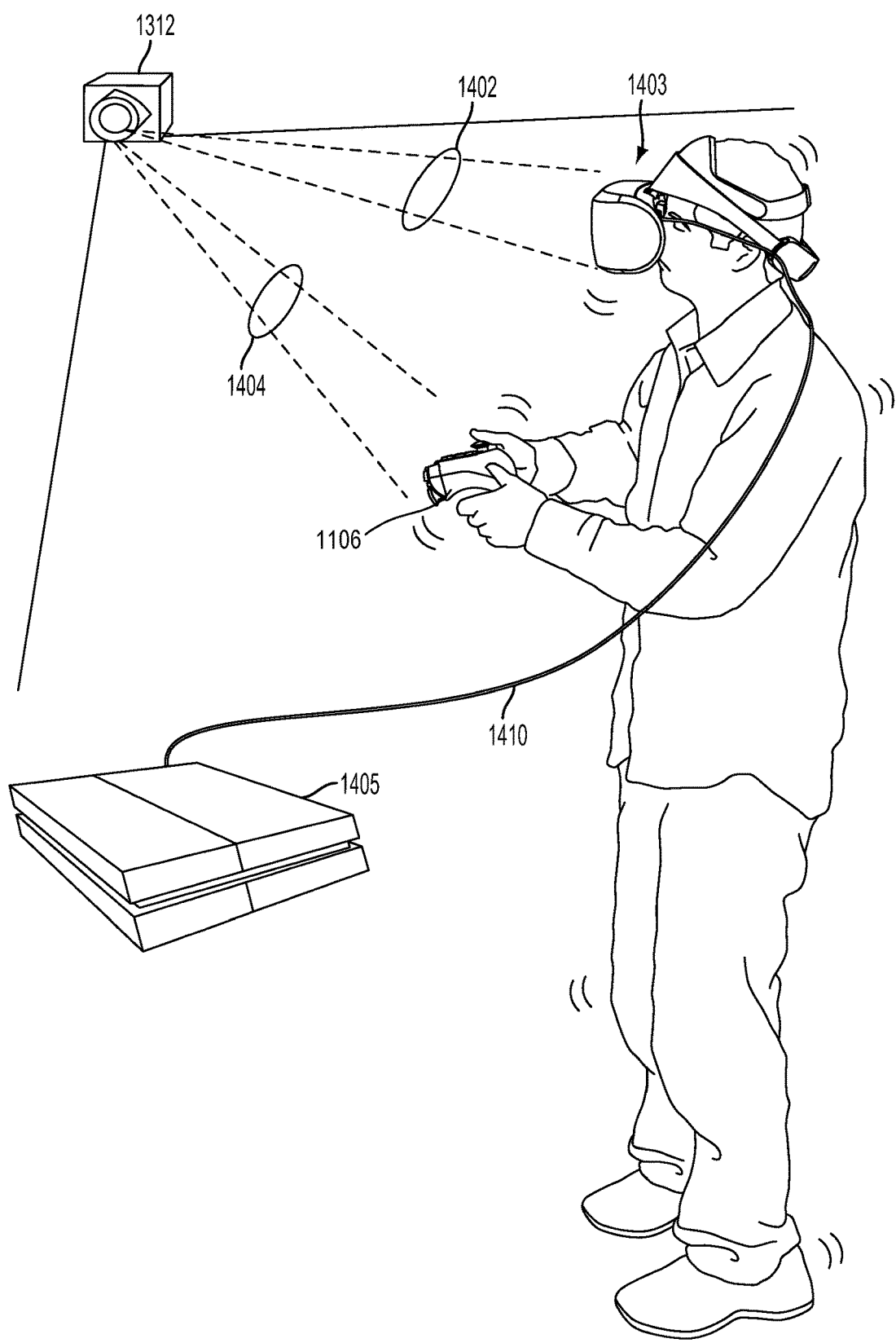
FIG. 13 illustrates a user wearing an HMD, during use, in accordance with one embodiment described in the present disclosure.

FIG. 13 illustrates a user wearing an HMD 1403, during use, in accordance with one embodiment. The HMD 1403 is an example of the HMD 102 (FIG. 1). In this example, it is shown that the HMD 1403 is tracked 1402 using image data obtained from captured video frames by the camera 1312. Additionally, it is shown that the hand-held controller 1106 is also tracked 1404 using image data obtained from captured video frames by the camera 1312. Also shown is the configuration where the HMD 1403 is connected to a game console 1405 via a cable 1410. The game console 1405 is an example of the game console 408 (FIG. 4A). In one embodiment, the HMD 102 obtains power from the same cable or connects to another cable. In still another embodiment, the HMD 102 has a battery that is rechargeable, so as to avoid extra power cords.

Figure 14:
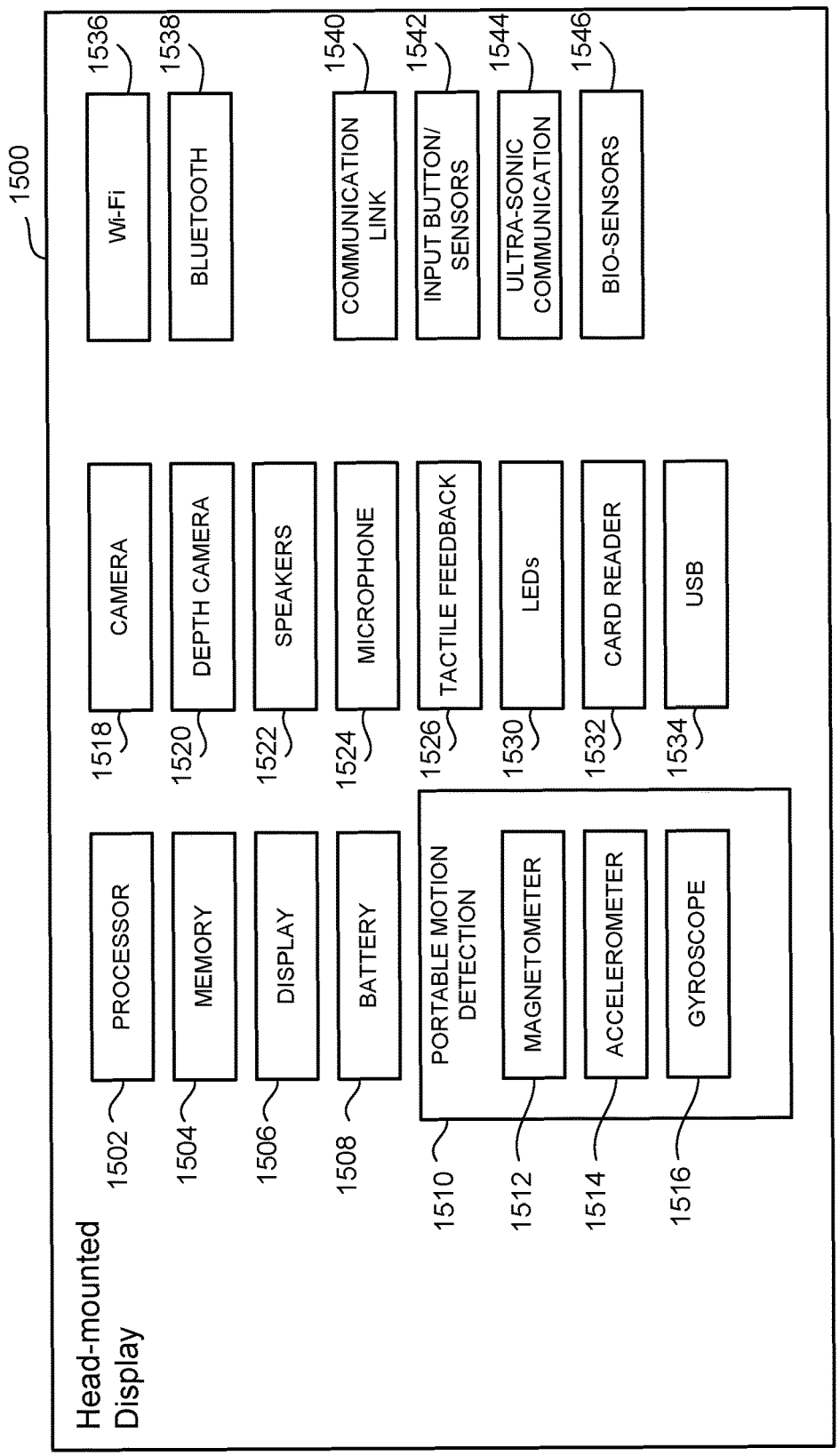
FIG. 14 is a diagram illustrating example components of an HMD, in accordance with one embodiment described in the present disclosure.

With reference to FIG. 14, a diagram is shown illustrating example components of an HMD 1500, in accordance with an embodiment described in the present disclosure. The HMD 1500 is an example of the HMD 102 (FIG. 1). It should be understood that in one embodiment, more or less components are included or excluded from the HMD 1500, depending on the configuration and functions enabled. The HMD 1500 includes a processor 1502 for executing program instructions. A memory 1504 is provided for storage purposes, and in one embodiment, includes both volatile and non-volatile memory. A display 1506 is included which provides a visual interface that the user 106 views.

The display 1506 is defined by one single display, or in the form of a separate display screen for each eye. When two display screens are provided, it is possible to provide left-eye and right-eye video content separately. Separate presentation of video content to each eye, for example, provides for better immersive control of 3D content. As described herein, in one embodiment, the second screen is provided with second screen content of the HMD 1500 by using the output for one eye, and then formatting the content for display in a 2D format. The one eye, in one embodiment, is the left-eye video feed, but in other embodiments, is the right-eye video feed.

A battery 1508 is provided as a power source for the HMD 1500. In other embodiments, the power source includes an outlet connection to power. In other embodiments, an outlet connection to power and the battery 1508 are provided. A motion detection module 1510 includes any of various kinds of motion sensitive hardware, such as a magnetometer 1512, an accelerometer 1514, and a gyroscope 1516.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers are used to provide the direction of gravity, which gives an absolute reference for two angles (world-space pitch and world-space roll).

A magnetometer measures the strength and direction of the magnetic field in the vicinity of an HMD. In one embodiment, three magnetometers are used within an HMD, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, accelerometer 1514 is used together with magnetometer 1512 to obtain the inclination and azimuth of the HMD 1500.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which is done using other available information, such as positional/orientation determination based on visual tracking of an object, accelerometer, magnetometer, etc.

A camera 1518 is provided for capturing images and image streams of the real-world environment. In one embodiment, more than one camera (optionally) is included in the HMD 1500, including a camera that is rear-facing, e.g., externally facing (directed away from the user 106 when the user 106 is viewing the display of the HMD 1500), etc., and a camera that is front-facing (directed towards the user 106 when the user is viewing the display of the HMD 1500). Additionally, in an embodiment, a depth camera 1520 is included in the HMD 1500 for sensing depth information of objects in the real-world environment. The depth camera 1520 is an externally facing camera.

The HMD 1500 includes speakers 1522 for providing audio output. Also, in one embodiment, a microphone 1524 is included for capturing audio from the real-world space, including sounds from an ambient environment, speech made by the user 106, etc. In an embodiment, the HMD 1500 includes tactile feedback module 1526, e.g., haptic feedback device, etc., for providing tactile feedback to the user 106. In one embodiment, the tactile feedback module 1526 is capable of causing movement and/or vibration of the HMD 1500 so as to provide tactile feedback to the user 106.

LEDs 1530 are provided as visual indicators of status of the HMD 1500. For example, an LED indicates battery level, power on, etc. A card reader 1532 is provided to enable the HMD 1500 to read and write information to and from a memory card. A USB interface 1534 is included as one example of an interface for enabling connection of peripheral devices, or connection to other devices, such as other portable devices, computers, etc. In various embodiments of the HMD 1500, any of various kinds of interfaces may be included to enable greater connectivity of the HMD 1500.

In an embodiment, a Wi-Fi module 1536 is included for enabling connection to the computer network 1103 or to a game console via wireless networking technologies. Also, in one embodiment, the HMD 1500 includes a Bluetooth module 1538 for enabling wireless connection to other devices, e.g., a game console, the computing device, etc. A communications link 1540 is included for connection to other devices. In one embodiment, the communications link 1540 utilizes infrared transmission for wireless communication. In other embodiments, the communications link 1540 utilizes any of various wireless or wired transmission protocols for communication with other devices.

Input buttons/sensors 1542 are included to provide an input interface for the user 106. Any of various kinds of input interfaces may be included, such as buttons, gestures, touchpad, joystick, trackball, etc. In one embodiment, an ultra-sonic communication module 1544 is included in HMD 1500 for facilitating communication with other devices via ultra-sonic technologies.

In an embodiment, bio-sensors 1546 are included to enable detection of physiological data, e.g., the biometric information, etc., from the user 106. In one embodiment, the bio-sensors 1546 include one or more dry electrodes for detecting bio-electric signals of the user 106 through the user's skin, voice detection, eye retina detection to identify users/profiles, etc.

The foregoing components of HMD 1500 have been described as merely exemplary components that may be included in HMD 1500. In various embodiments described in the present disclosure, the HMD 1500 may or may not include some of the various aforementioned components. Embodiments of the HMD 1500 may additionally include other components not presently described, but known in the art, for purposes of facilitating aspects of the present invention as herein described.

It will be appreciated by those skilled in the art that in various embodiments described in the present disclosure, the aforementioned handheld device is utilized in conjunction with an interactive application displayed on a display to provide various interactive functions. The exemplary embodiments described herein are provided by way of example only, and not by way of limitation.

In one embodiment, the computer 1102, as referred to herein, includes a personal computer, or a game console, or a tablet computer, or a smart phone, or a set-top box, or a kiosk, or a wireless device, or a digital pad, or a stand-alone device, or a handheld game playing device, etc. In an embodiment, the computer 1102 receives encoded video streams, decodes the video streams, and presents the resulting video to the user 106, e.g., a player of a game. The processes of receiving encoded video streams and/or decoding the video streams typically includes storing individual video frames in a receive buffer of the computer 1102. The video streams are presented to the user 106 on a display integral to the computer 1102 or on a separate device such as a monitor or television or an HMD.

The computer 1102, in one embodiment, supports more than one game player. For example, a game console supports two, three, four or more simultaneous players (e.g., P1, P2, . . . Pn). Each of these players receives or shares a video stream, or a single video stream includes regions of a frame generated specifically for each player, e.g., generated based on each player's point of view. Any number of computers are local (e.g., co-located) or are geographically dispersed. The number of computers included in a game system varies widely from one or two to thousands, tens of thousands, or more. As used herein, the term "game player" is used to refer to a person that plays a game and the term "game playing device" is used to refer to a device used to play a game.

In some embodiments, the game playing device refers to a plurality of computing devices that cooperate to deliver a game experience to a user. For example, a game console and an HMD cooperate with a video server system to deliver a game viewed through the HMD. As another example, the game console receives a video stream from the video server system and the game console forwards the video stream, or updates to the video stream, to an HMD and/or television for rendering.

Still further, an HMD is used for viewing and/or interacting with any type of content produced or used, such as, for example, video game content, movie content, video clip content, web content, advertisement content, contest content, gambling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content is rendered so long as it is viewed in the HMD or rendered to a screen or screen of the HMD.

In an embodiment, computers further include systems that modify received video. For example, a computer performs further rendering, to overlay one video image on another video image, to crop a video image, and/or the like. As another example, computers receive various types of video frames, such as I-frames, P-frames and B-frames, and to process these frames into images for display to a user. In some embodiments, a part of a computer performs further rendering, shading, conversion to 3-D, conversion to two-dimensional (2D) image, distortion removal, sizing, or like operations on a video stream. In an embodiment, a part of a computer is receives more than one audio or video stream.

Input devices of computers includes, for example, a one-hand game controller, or a two-hand game controller, or a gesture recognition system, or a gaze recognition system, or a voice recognition system, or a keyboard, or a joystick, or a pointing device, or a force feedback device, or a motion and/or location sensing device, or a mouse, or a touch screen, or a neural interface, or a camera, or a combination of two or more thereof, etc.

A video source includes rendering logic, e.g., hardware, firmware, and/or software stored on a computer-readable medium such as storage. This rendering logic creates video frames of the video stream based on the game state. All or part of the rendering logic is optionally disposed within one or more graphics processing unit (GPU). Rendering logic includes processing stages for determining three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x, Xvid, FFmpeg, x264, VP6-8, realvideo, mp3, or the like. The encoding process produces a video stream that is optionally packaged for delivery to a decoder on a device. The video stream is characterized by a frame size and a frame rate.

Typical frame sizes include 800×600 pixels, 1280×720 pixels, 1024×768 pixels, 1080 pixels, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, a computer is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a computer as defined herein. In one embodiment, a cloud gaming server is configured to detect a type of a computer, which is being utilized by the user 106, and provide a cloud-gaming experience appropriate to the user's computer. For example, image settings, audio settings and other types of settings are optimized for the user's computer.

Figure 15:
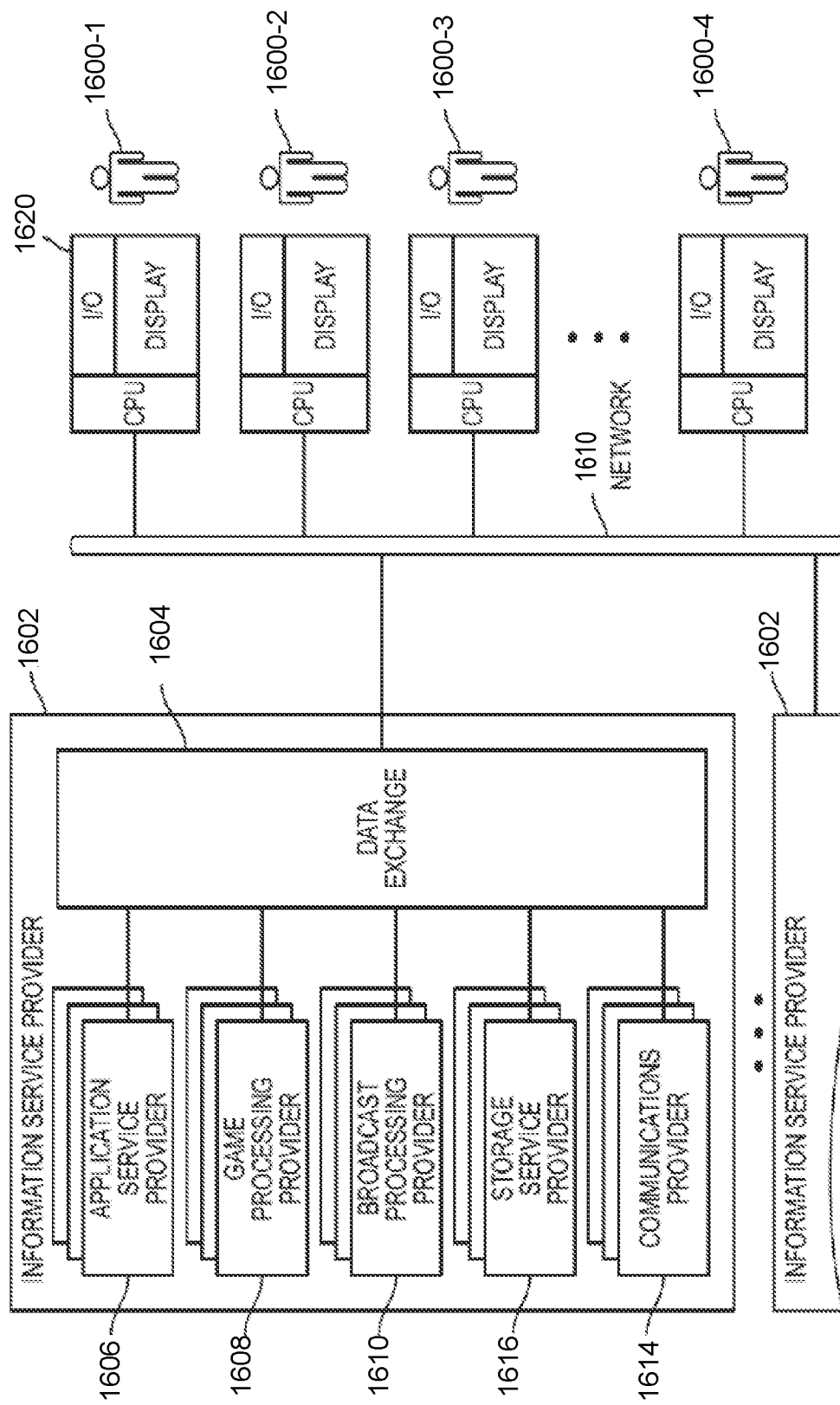
FIG. 15 illustrates an Information Service Provider architecture, in accordance with one embodiment described in the present disclosure.

FIG. 15 illustrates an embodiment of an Information Service Provider architecture. Information Service Providers (ISP) 1602 delivers a multitude of information services to users 1600-1, 1600-2, 1600-3, 1600-4, etc., geographically dispersed and connected via a network 1610, which is an example of the network 1103 (FIG. 10). In one embodiment, an ISP delivers one type of service, such as stock price updates, or a variety of services such as broadcast media, news, sports, gaming, etc. Additionally, the services offered by each ISP are dynamic, that is, services are added or taken away at any point in time. Thus, the ISP providing a particular type of service to a particular individual changes over time. For example, a user is served by an ISP in near proximity to the user while the user is in her home town, and the user is served by a different ISP when the user travels to a different city. The home-town ISP will transfer information and data to the new ISP, such that information regarding the user 106 "follows" the user 106 to the new city making the data closer to the user 106 and easier to access. In another embodiment, a master-server relationship is established between a master ISP, which manages the information for the user 106, and a server ISP that interfaces directly with the user 106 under control from the master ISP. In another embodiment, the data is transferred from one ISP to another ISP as a computer moves around the world to make the ISP in better position to service the user 106 be the one that delivers these services.

ISP 1602 includes an application service provider (ASP) 1606, which provides computer-based services to customers over the network 1610. Software offered using an ASP model is also sometimes called on-demand software or software as a service (SaaS). A simple form of providing access to a particular application program (such as customer relationship management) is by using a standard protocol such as hypertext transfer protocol (HTTP). The application software resides on the vendor's system and is accessed by users through a web browser using hypertext markup language (HTML), by special purpose client software provided by the vendor, or other remote interface such as a thin client.

Services delivered over a wide geographical area often use cloud computing. Cloud computing is a style of computing in which dynamically scalable resources are provided as a service over the network 1610. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1602 includes a game processing server (GPS) 1608, which is used by game computers to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS 1608 establishes communication between the players and their respective game-playing devices exchange information without relying on the centralized GPS 1608.

Dedicated GPSs are servers which run independently of a computer. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

A broadcast processing server (BPS) 1610 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content reaches almost any country in the world.

A storage service provider (SSP) 1612 provides computer storage space and related management services. SSPs also offer periodic backup and archiving. By offering storage as a service, users orders more storage as needed. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, the user 106 accesses personal files in a home computer, as well as in a mobile phone while the user 106 is on the move.

A communications provider 1614 provides connectivity to users. One kind of communications provider is an Internet Service Provider (ISP) which offers access to the Internet. The ISP connects its customers using a data transmission technology appropriate for delivering Internet Protocol datagrams, such as dial-up, digital subscriber line (DSL), cable modem, fiber, wireless or dedicated high-speed interconnects. The Communications Provider also provides messaging services, such as e-mail, instant messaging, and short message service (SMS) texting. Another type of communications provider is a Network Service provider (NSP), which sells bandwidth or network access by providing direct backbone access to the Internet. Network service providers, in one embodiment, include telecommunications companies, data carriers, wireless communications providers, Internet service providers, cable television operators offering high-speed Internet access, etc.

A data exchange 1604 interconnects the several modules inside ISP 1602 and connects these modules to users 1600 via the network 1610. The data exchange 1604 covers a small area where all the modules of ISP 1602 are in close proximity, or covers a large geographic area when the different modules are geographically dispersed. For example, the data exchange 1688 includes a fast Gigabit Ethernet (or faster) within a cabinet of a data center, or an intercontinental interactive area network (VLAN).

Each user 1600-1, 1600-2, 1600-3, and 1600-4 accesses the remote services with a client device 1620, which includes at least a CPU, a display and input/output interface (I/O). In one embodiment, a client device is a personal computer (PC), a mobile phone, a netbook, tablet, gaming system, a personal digital assistant (PDA), etc. In one embodiment, the ISP 1602 recognizes a type of client device and adjusts the communication method employed. In other cases, client devices use a standard communications method, such as HTML, to access the ISP 1602.

In one embodiment, instead of a game console, a computing device, e.g., a tablet, a computer, a smart television, etc., is used to perform the operations described herein as being performed by the game console.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a NAS, a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

It should be noted that in some embodiments, any of the embodiments described herein are combined with any of the remaining embodiments described herein.

Moreover, although some of the above-described embodiments are described with respect to a gaming environment, in some embodiments, instead of a game, other environments, e.g., a video conferencing environment, etc., is used.

In one embodiment, a pinch and hold gesture is broadly construed as a gesture for signaling to a processor that the user 106 wishes to grab an image, e.g., the scene 202A, any other scenes described herein, etc., and decouple the image from movement of head of the user 106. For example, once a scene couples to a hand of the user 106 after a pinch and hold gesture is performed by the hand, head movement of the user 106 does not affect, e.g., move, rotate, twist, turn, tilt, change, zoom-in, zoom-out, expand, contract, add more objects to, remove objects from, etc., the scene. Examples of pinching include grabbing, or holding, or grasping, or touching, or clasping, or maneuvering, or attaining, or directing, or contacting, or moving, or having, or acquiring, or a combination of two or more thereof. Therefore, generically, a pinch and hold gesture is any number of gestures to control a scene using one or both hands of the user 106.

In an embodiment, a hold gesture is associated with a pinch gesture. For example, the hold gesture is holding the pinch gesture for greater than a pre-determined amount of time.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A system including:
a head-mounted display (HMD) configured to be worn by a user;
a glove configured to be worn by a hand of the user, the glove having finger segments for each finger of the hand, each finger segment includes a sensor for detecting positions of the finger segment when moved;
one or more cameras for capturing images of the HMD and images of the glove;
a computing device connected to the one or more cameras and interfaced with the HMD and the glove,
wherein the computing device is configured to analyze data from the sensors of the finger segments to determine that a pinch and hold gesture is performed by two of the finger segments,
wherein the computing device is configured to generate visual cue data that is communicated to the HMD, such that a scene rendered on the HMD is modified to render a visual cue indicative of a location associated with the pinch and hold gesture, wherein the location is within the scene, wherein the scene includes a virtual object and a background,
wherein while the pinch and hold gesture is active, the computing device is configured for coupling movement of the glove with movement of the virtual object and background, such that the virtual object and background move together with movement of the glove,
wherein during a time period in which the pinch and hold gesture is active, the computing device does not move the scene with any movement of the HMD.

2. The system of claim 1, wherein the computing device is configured to release the coupling between the movement of the glove and the movement of the scene when the pinch and hold gesture is determined to be deactivated.

3. The system of claim 1, wherein the computing device is configured to determine whether a rotate gesture is performed by the glove while the pinch and hold gesture is active, wherein the computing device is configured to send data for rotating the scene in response to determining that the rotate gesture is performed.

4. The system of claim 1, wherein the computing device is configured to determine whether a slide gesture is performed by the glove while the pinch and hold gesture is active, wherein the computing device is configured to send data for translating the scene in response to determining that the slide gesture is performed, the translation of the scene rendering a non-displayed portion of the scene, the non-displayed portion not rendered on the HMD before the translation motion occurs.

5. The system of claim 1, wherein the computing device is configured to determine a position of each of the finger segments from the images of the glove, wherein the computing device is configured to determine from the positions of the finger segments that a portion of one of the two finger segments is in contact with a portion of another one of the two finger segments to determine that the pinch and hold gesture is performed by the two finger segments.

6. The system of claim 1, wherein the computing device is configured to send data for displaying an image of the hand of the user in the scene, wherein the visual cue is generated at the location in the scene at which the image of the hand performs the pinch and hold gesture.

7. A method for translating a viewable portion of a scene viewed via a head-mounted display (HMD), the method comprising:
capturing images of the HMD configured to be worn by a user in a real space to determine a view direction and changes in the view direction;
capturing images of a hand of the user;
tracking the hand of the user from the captured images of the hand;
activating a pinning of the scene as viewed via the HMD, such that the pinning fixes the scene to a location based on the hand being tracked, the pinning being activated upon detecting a pinch and hold gesture performed by the hand;

enabling a translation of the scene in response to movement of the hand while the pinning is active, the translation enabling a view beyond a current view of the scene to include a virtual object absent from the current view, wherein during a time period in which the pinch and hold gesture is being performed, the scene does not move with any movement of the HMD;

disabling a translation of the scene when the pinning is detected to be inactive, the pinning is inactive when the pinch and hold gesture is no longer detected.

8. The method of claim 7, further comprising:
tracking the HMD from the captured images of the HMD; and
enabling a change in the viewable portion of the scene when the pinning is detected to be inactive and when movement of the HMD is tracked.

9. The method of claim 7, further comprising generating a cue within the viewable portion of the scene to indicate that the pinning is activated.

10. The method of claim 7, wherein said activating the pinning of the scene is executed when the pinch and hold is determined to be performed for greater than a pre-determined amount of time.

11. The method of claim 7, further comprising:
receiving gesture data regarding an additional gesture performed by the user while the pinch and hold gesture is performed; and
modifying the viewable portion of the scene according to the gesture data.

12. The method of claim 7, further comprising:
capturing images of another hand of the user;
tracking the other hand of the user from the captured images of the other hand;
facilitating rotation of the scene when from tracking the other hand, it is determined that a rotate gesture is performed by the other hand of the user, wherein the rotation of the scene is facilitated while the scene is fixed to the location.

13. The method of claim 7, wherein the pinch and hold gesture is no longer detected when a thumb of the hand is not is contact with a finger of the hand.

14. A method for changing a size of a scene viewed via a head-mounted display (HMD), the method comprising:
capturing images of the HMD configured to be worn by a user in a real space to determine a view direction and changes in the view direction;
capturing images of hands of the user;
determining from the captured images of the hands that each hand performs a pinch and hold gesture;
fixing the scene to locations in the scene at which the captured images of the hands indicate the pinch and hold gestures are being performed;
enabling change in a size of the scene in response to relative changes in separation between the hands while the scene is fixed,
wherein during a time period in which the pinch and hold gesture is being performed, the scene does not move with any movement of the HMD; and
disabling change in the size of the scene when one of the pinch and hold gestures from one of the hands is detected from the captured images of the hands to have been released.

15. The method of claim 14, further comprising:
generating data for zooming-in the scene in response to determining that the separation is increasing; and
generating data for zooming-out the scene in response to determining that the separation is decreasing.

16. The method of claim 14, further comprising:
determining whether the hands move away or towards the HMD;
facilitating zooming-in of the scene upon determining that the hands move towards the HMD; and
facilitating zooming-out of the scene upon determining that the hands move away from the HMD.

17. The method of claim 14, further comprising:
determining whether the hands move away or towards the HMD in a direction substantially parallel to a width of a torso of the user;
facilitating zooming-out of the scene upon determining that the hands move towards the HMD in the direction;
facilitating zooming-in of the scene upon determining that the hands move away from the HMD in the direction.

18. The method of claim 14, wherein the images of the hands are captured to determine positions and orientations of the hands, the method further comprising:
analyzing the positions and orientations to determine whether the hands perform rotate gestures;
providing data for enabling tilting of an object in the scene in response to determining that the hands perform the rotate gestures.

19. The method of claim 14, further comprising:
determining from the captured images of the hands whether the separation between the hands is changing while the hands move in a direction substantially perpendicular to a width of a torso of the user;
identifying from the captured images of the hands a dominant motion between a motion in which the separation changes and the movement in the direction substantially perpendicular to the width of the torso of the user;
determining a submissive motion from the dominant motion; and
enabling change in the size of the scene according to the dominant motion while ignoring the submissive motion.

20. The method of claim 14, further comprising:
determining from the captured images of the hands whether the separation between the hands is changing while the hands rotate around an axis substantially parallel to a width of a torso of the user;
identifying from the captured images of the hands a dominant motion between a motion in which the separation changes and a motion in which the hands rotate;
determining a submissive motion from the dominant motion; and
enabling change in the scene according to the dominant motion while ignoring the submissive motion.

21. The method of claim 14, further comprising:
determining a first relative position between the HMD and the one of the hands;
determining a second relative position between the HMD and another one of the hands; and
sending for display image data for the hands to the HMD upon determining that the hands are within a field-of-view of the HMD, the determination that the hands are within the field-of-view is made from the first and second relative positions.

22. The system of claim 1, wherein the virtual object and the background move together to include an additional virtual object within the scene, wherein the additional virtual object is not present within the scene before the movement of the virtual object and the background.

23. The system of claim 1, wherein the captured images of the HMD include image data regarding the movement of the HMD, wherein the computing device is configured to receive the image data regarding the movement of the HMD, wherein the computing device is configured to determine that the movement of the HMD occurred during the time period in which the pinch and hold gesture is active, wherein the computing device is configured to ignore the image data regarding the movement of the HMD upon determining that the movement of the HMD occurred during the time period in which the pinch and hold gesture is active.

24. The method of claim 7, wherein the captured images of the HMD include image data regarding the movement of the HMD, the method further comprising:
receiving the image data regarding the movement of the HMD;
determining from the image data regarding the movement of the HMD that the movement of the HMD occurred during the time period in which the pinch and hold gesture is active;
ignoring the image data regarding the movement of the HMD upon determining that the movement of the HMD occurred during the time period in which the pinch and hold gesture is active.

25. The method of claim 14, wherein the captured images of the HMD include image data regarding the movement of the HMD, the method further comprising:
receiving the image data regarding the movement of the HMD;
determining from the image data regarding the movement of the HMD that the movement of the HMD occurred during the time period in which the pinch and hold gesture is active;
ignoring the image data regarding the movement of the HMD upon determining that the movement of the HMD occurred during the time period in which the pinch and hold gesture is active.

* * * * *